US010284843B2

(12) United States Patent
Tourapis et al.

(10) Patent No.: US 10,284,843 B2
(45) Date of Patent: *May 7, 2019

(54) VIDEO CODING

(71) Applicant: Microsoft Technology Licensing, LLC, Redmond, WA (US)

(72) Inventors: Alexandros Tourapis, Nicosia (CY); Feng Wu, Beijing (CN); Shipeng Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/867,361

(22) Filed: Jan. 10, 2018

(65) Prior Publication Data

US 2018/0131933 A1 May 10, 2018

Related U.S. Application Data

(60) Continuation of application No. 13/850,178, filed on Mar. 25, 2013, now Pat. No. 9,888,237, which is a
(Continued)

(51) Int. Cl.
H04N 19/56 (2014.01)
H04N 19/109 (2014.01)
(Continued)

(52) U.S. Cl.
CPC ......... H04N 19/109 (2014.11); H04N 19/147 (2014.11); H04N 19/176 (2014.11);
(Continued)

(58) Field of Classification Search
CPC ........ H04N 19/51; H04N 19/56; H04N 19/61; H04N 19/63; H04N 19/147
(Continued)

(56) References Cited

U.S. PATENT DOCUMENTS 4,454,546 A 6/1984 Mori
4,661,849 A 4/1987 Hinman
(Continued)

FOREIGN PATENT DOCUMENTS

EP 0 279 053 8/1988
EP 0 397 402 11/1990
(Continued)

OTHER PUBLICATIONS

U.S. Appl. No. 60/341,674, filed Dec. 17, 2001, Lee et al.
(Continued)

Primary Examiner — Tung T Vo
(74) Attorney, Agent, or Firm — Klarquist Sparkman, LLP

(57) ABSTRACT

Improved video coding is described to encode video data within a sequence of video frames. To this end, at least a portion of a reference frame is encoded to include motion information associated with the portion of the reference frame. At least a portion of a predictable frame that includes video data predictively correlated to said portion of said reference frame is defined based on the motion information. At least said portion of the predictable frame is encoded without including corresponding motion information and including mode identifying data. The mode identifying data indicate that the encoded portion of the predictable frame can be directly derived using at least the motion information associated with the portion of the reference frame.

20 Claims, 9 Drawing Sheets

Related U.S. Application Data continuation of application No. 12/474,821, filed on May 29, 2009, now Pat. No. 8,406,300, which is a division of application No. 11/275,103, filed on Dec. 9, 2005, now Pat. No. 7,646,810, which is a continuation of application No. 10/186,284, filed on Jun. 27, 2002, now Pat. No. 7,003,035.

(60) Provisional application No. 60/376,005, filed on Apr. 26, 2002, provisional application No. 60/352,127, filed on Jan. 25, 2002.

(51) Int. Cl.
| | | |
|---|---|---|
| *H04N 19/52* | (2014.01) | |
| *H04N 19/176* | (2014.01) | |
| *H04N 19/147* | (2014.01) | |
| *H04N 19/513* | (2014.01) | |
| *H04N 19/573* | (2014.01) | |
| *H04N 19/577* | (2014.01) | |

(52) U.S. Cl.
CPC ........... *H04N 19/513* (2014.11); *H04N 19/52* (2014.11); *H04N 19/56* (2014.11); *H04N 19/573* (2014.11); *H04N 19/577* (2014.11)

(58) Field of Classification Search
USPC .................................................. 375/240.14
See application file for complete search history.

(56) References Cited

U.S. PATENT DOCUMENTS

| | | | |
|---|---|---|---|
| 4,661,853 | A | 4/1987 | Roeder et al. |
| 4,695,882 | A | 9/1987 | Wada et al. |
| 4,796,087 | A | 1/1989 | Guichard et al. |
| 4,849,812 | A | 7/1989 | Borgers et al. |
| 4,862,267 | A | 8/1989 | Gillard et al. |
| 4,864,393 | A | 9/1989 | Harradine et al. |
| 5,021,879 | A | 6/1991 | Vogel |
| 5,068,724 | A | 11/1991 | Krause et al. |
| 5,089,887 | A | 2/1992 | Robert et al. |
| 5,089,889 | A | 2/1992 | Sugiyama |
| 5,091,782 | A | 2/1992 | Krause et al. |
| 5,103,306 | A | 4/1992 | Weiman et al. |
| 5,111,292 | A | 5/1992 | Kuriacose et al. |
| 5,117,287 | A | 5/1992 | Koike et al. |
| 5,132,792 | A | 7/1992 | Yonemitsu et al. |
| 5,157,490 | A | 10/1992 | Kawai et al. |
| 5,175,618 | A | 12/1992 | Ueda |
| 5,185,819 | A | 2/1993 | Ng et al. |
| 5,193,004 | A | 3/1993 | Wang et al. |
| 5,223,949 | A | 6/1993 | Honjo |
| 5,227,878 | A | 7/1993 | Puri et al. |
| 5,235,618 | A | 8/1993 | Sakai et al. |
| 5,260,782 | A | 11/1993 | Hui |
| 5,287,420 | A | 2/1994 | Barrett |
| 5,298,991 | A | 3/1994 | Yagasaki et al. |
| 5,317,397 | A | 5/1994 | Odaka et al. |
| 5,343,248 | A | 8/1994 | Fujinami |
| 5,347,308 | A | 9/1994 | Wai |
| 5,386,234 | A | 1/1995 | Veltman et al. |
| 5,400,075 | A | 3/1995 | Savatier |
| 5,412,430 | A | 5/1995 | Nagata |
| 5,412,435 | A | 5/1995 | Nakajima |
| RE34,965 | E | 6/1995 | Sugiyama |
| 5,424,779 | A | 6/1995 | Odaka |
| 5,428,396 | A | 6/1995 | Yagasaki |
| 5,442,400 | A | 8/1995 | Sun |
| 5,448,297 | A | 9/1995 | Alattar et al. |
| 5,453,799 | A | 9/1995 | Yang et al. |
| 5,461,421 | A | 10/1995 | Moon |
| RE35,093 | E | 11/1995 | Wang et al. |
| 5,467,086 | A | 11/1995 | Jeong |
| 5,467,134 | A | 11/1995 | Laney et al. |
| 5,467,136 | A | 11/1995 | Odaka |
| 5,477,272 | A | 12/1995 | Zhang et al. |
| RE35,158 | E | 2/1996 | Sugiyama |
| 5,510,840 | A | 4/1996 | Yonemitsu et al. |
| 5,539,466 | A | 7/1996 | Igarashi et al. |
| 5,565,922 | A | 10/1996 | Krause |
| 5,594,504 | A | 1/1997 | Ebrahimi |
| 5,598,215 | A | 1/1997 | Watanabe |
| 5,598,216 | A | 1/1997 | Lee |
| 5,612,732 | A * | 3/1997 | Yuyama ............... H04N 1/0044 348/14.01 |
| 5,617,144 | A | 4/1997 | Lee |
| 5,619,281 | A | 4/1997 | Jung |
| 5,621,481 | A | 4/1997 | Yasuda et al. |
| 5,623,311 | A | 4/1997 | Phillips et al. |
| 5,648,819 | A | 7/1997 | Tranchard |
| 5,666,461 | A | 9/1997 | Igarashi et al. |
| 5,677,735 | A | 10/1997 | Ueno et al. |
| 5,687,097 | A | 11/1997 | Mizusawa et al. |
| 5,691,771 | A | 11/1997 | Oishi et al. |
| 5,699,476 | A | 12/1997 | Van Der Meer |
| 5,701,164 | A | 12/1997 | Kato |
| 5,717,441 | A | 2/1998 | Serizawa et al. |
| 5,731,850 | A | 3/1998 | Maturi et al. |
| 5,734,755 | A | 3/1998 | Ramchandran et al. |
| 5,748,784 | A | 5/1998 | Sugiyama |
| 5,754,239 | A * | 5/1998 | Wilkinson ............. H04N 19/61 375/240.15 |
| 5,767,898 | A | 6/1998 | Urano et al. |
| 5,786,860 | A | 7/1998 | Kim et al. |
| 5,787,203 | A | 7/1998 | Lee et al. |
| 5,796,438 | A | 8/1998 | Hosono |
| 5,798,788 | A | 8/1998 | Meehan et al. |
| RE35,910 | E | 9/1998 | Nagata et al. |
| 5,822,541 | A | 10/1998 | Nonomura et al. |
| 5,835,144 | A | 11/1998 | Matsumura et al. |
| 5,844,613 | A | 12/1998 | Chaddha |
| 5,847,776 | A | 12/1998 | Khmelnitsky |
| 5,874,995 | A | 2/1999 | Naimpally et al. |
| 5,886,742 | A | 3/1999 | Hibi et al. |
| 5,901,248 | A | 5/1999 | Fandrianto et al. |
| 5,905,535 | A | 5/1999 | Kerdranvat |
| 5,923,375 | A | 7/1999 | Pau |
| 5,926,573 | A | 7/1999 | Kim et al. |
| 5,929,940 | A | 7/1999 | Jeannin |
| 5,946,042 | A | 8/1999 | Kato |
| 5,949,489 | A | 9/1999 | Nishikawa et al. |
| 5,959,673 | A | 9/1999 | Lee et al. |
| 5,963,258 | A | 10/1999 | Nishikawa et al. |
| 5,963,673 | A * | 10/1999 | Kodama ............... H04N 19/577 375/E7.121 |
| 5,970,173 | A | 10/1999 | Lee et al. |
| 5,970,175 | A | 10/1999 | Nishikawa et al. |
| 5,973,743 | A | 10/1999 | Han |
| 5,973,755 | A | 10/1999 | Gabriel |
| 5,974,183 | A * | 10/1999 | Wilkinson ............. H04N 19/63 375/E7.03 |
| 5,982,438 | A | 11/1999 | Lin et al. |
| 5,990,960 | A | 11/1999 | Murakami et al. |
| 5,991,447 | A | 11/1999 | Eifrig et al. |
| 6,002,439 | A | 12/1999 | Murakami et al. |
| 6,005,980 | A | 12/1999 | Eifrig et al. |
| RE36,507 | E | 1/2000 | Iu |
| 6,011,596 | A | 1/2000 | Burl |
| 6,026,195 | A | 2/2000 | Eifrig et al. |
| 6,040,863 | A | 3/2000 | Kato |
| 6,055,012 | A | 4/2000 | Haskell et al. |
| 6,067,322 | A | 5/2000 | Wang |
| 6,081,209 | A | 6/2000 | Schuyler et al. |
| 6,091,460 | A | 7/2000 | Hatano et al. |
| 6,094,225 | A | 7/2000 | Han |
| RE36,822 | E | 8/2000 | Sugiyama |
| 6,097,759 | A | 8/2000 | Murakami et al. |
| 6,130,963 | A | 10/2000 | Uz et al. |
| 6,154,495 | A | 11/2000 | Yamaguchi et al. |
| 6,167,090 | A | 12/2000 | Iizuka |
| 6,175,592 | B1 | 1/2001 | Kim et al. |
| 6,188,725 | B1 | 2/2001 | Sugiyama |
| 6,188,794 | B1 | 2/2001 | Nishikawa et al. |

(56) References Cited

U.S. PATENT DOCUMENTS

| | | | |
|---|---|---|---|
| 6,192,081 B1 | 2/2001 | Chiang et al. |
| 6,201,927 B1 | 3/2001 | Comer |
| 6,205,176 B1 | 3/2001 | Sugiyama |
| 6,205,177 B1 | 3/2001 | Girod et al. |
| RE37,222 E | 6/2001 | Yonemitsu et al. |
| 6,243,418 B1 | 6/2001 | Kim |
| 6,263,024 B1 | 7/2001 | Matsumoto |
| 6,263,065 B1 | 7/2001 | Durinovic-Johri et al. |
| 6,269,121 B1 | 7/2001 | Kwak |
| 6,271,885 B2 | 8/2001 | Sugiyama |
| 6,272,179 B1 | 8/2001 | Kadono |
| 6,282,243 B1 | 8/2001 | Kazui et al. |
| 6,295,376 B1 | 9/2001 | Nakaya |
| 6,301,301 B1 | 10/2001 | Isu et al. |
| 6,307,887 B1 | 10/2001 | Gabriel |
| 6,307,973 B2 | 10/2001 | Nishikawa et al. |
| 6,320,593 B1 | 11/2001 | Sobel |
| 6,324,216 B1 | 11/2001 | Igarashi et al. |
| 6,377,628 B1 | 4/2002 | Schultz et al. |
| 6,381,279 B1 | 4/2002 | Taubman |
| 6,404,813 B1 | 6/2002 | Haskell et al. |
| 6,414,992 B1* | 7/2002 | Sriram ................ H04N 19/56 375/240.02 |
| 6,427,027 B1 | 7/2002 | Suzuki et al. |
| 6,459,812 B2 | 10/2002 | Suzuki et al. |
| 6,483,874 B1 | 11/2002 | Panusopone et al. |
| 6,496,601 B1 | 12/2002 | Migdal et al. |
| 6,519,287 B1 | 2/2003 | Hawkins et al. |
| 6,529,632 B1 | 3/2003 | Nakaya et al. |
| 6,539,056 B1 | 3/2003 | Sato et al. |
| 6,563,953 B2 | 5/2003 | Lin et al. |
| 6,614,442 B1 | 9/2003 | Ouyang et al. |
| 6,633,611 B2 | 10/2003 | Sekiguchi et al. |
| 6,636,565 B1 | 10/2003 | Kim |
| 6,647,061 B1 | 11/2003 | Panusopone et al. |
| 6,650,781 B2 | 11/2003 | Nakaya |
| 6,654,419 B1 | 11/2003 | Sriram et al. |
| 6,654,420 B1 | 11/2003 | Snook |
| 6,671,319 B1 | 12/2003 | Chang et al. |
| 6,683,987 B1 | 1/2004 | Sugahara |
| 6,697,430 B1 | 2/2004 | Yasunari et al. |
| 6,697,431 B1* | 2/2004 | Yoneyama ............ H04N 19/61 375/240.16 |
| 6,704,360 B2* | 3/2004 | Haskell ................. H04N 19/56 348/409.1 |
| 6,728,317 B1 | 4/2004 | Demos |
| 6,735,345 B2 | 5/2004 | Lin et al. |
| 6,765,965 B1 | 7/2004 | Hanami et al. |
| RE38,563 E | 8/2004 | Eifrig et al. |
| RE38,564 E | 8/2004 | Eifrig et al. |
| 6,785,331 B1 | 8/2004 | Jozawa et al. |
| 6,798,364 B2 | 9/2004 | Chen et al. |
| 6,798,837 B1* | 9/2004 | Uenoyama ............ H04N 19/61 375/240.16 |
| 6,807,231 B1 | 10/2004 | Wiegand et al. |
| 6,816,552 B2 | 11/2004 | Demos |
| 6,873,657 B2 | 3/2005 | Yang et al. |
| 6,876,703 B2 | 4/2005 | Ismaeil et al. |
| 6,900,846 B2 | 5/2005 | Lee et al. |
| 6,920,175 B2 | 7/2005 | Karczewicz et al. |
| 6,975,680 B2 | 12/2005 | Demos |
| 6,980,596 B2 | 12/2005 | Wang et al. |
| 6,999,513 B2 | 2/2006 | Sohn et al. |
| 7,003,035 B2 | 2/2006 | Tourapis et al. |
| 7,023,922 B1* | 4/2006 | Xu ........................ H04N 19/147 375/240.19 |
| 7,054,494 B2 | 5/2006 | Lin et al. |
| 7,092,576 B2 | 8/2006 | Srinivasan et al. |
| 7,154,952 B2 | 12/2006 | Tourapis et al. |
| 7,233,621 B2 | 6/2007 | Jeon |
| 7,280,700 B2 | 10/2007 | Tourapis et al. |
| 7,317,839 B2 | 1/2008 | Holcomb |
| 7,346,111 B2 | 3/2008 | Winger et al. |
| 7,362,807 B2 | 4/2008 | Kondo et al. |
| 7,388,916 B2 | 6/2008 | Park et al. |
| 7,567,617 B2 | 7/2009 | Holcomb |
| 7,609,763 B2 | 10/2009 | Mukerjee et al. |
| 7,630,438 B2 | 12/2009 | Mukerjee et al. |
| 7,646,810 B2 | 1/2010 | Tourapis et al. |
| 7,733,960 B2 | 6/2010 | Kondo et al. |
| 8,189,666 B2 | 5/2012 | Wu et al. |
| 8,254,455 B2 | 8/2012 | Wu et al. |
| 8,379,722 B2 | 2/2013 | Tourapis et al. |
| 8,406,300 B2 | 3/2013 | Tourapis et al. |
| 8,774,280 B2 | 7/2014 | Tourapis et al. |
| 2001/0019586 A1 | 9/2001 | Kang et al. |
| 2001/0040926 A1 | 11/2001 | Hannuksela et al. |
| 2002/0025077 A1* | 2/2002 | De Haan ................ H04N 19/51 382/238 |
| 2002/0105596 A1 | 8/2002 | Selby |
| 2002/0114388 A1 | 8/2002 | Ueda |
| 2002/0122488 A1 | 9/2002 | Takahashi et al. |
| 2002/0154693 A1 | 10/2002 | Demos |
| 2002/0186890 A1 | 12/2002 | Lee et al. |
| 2003/0016755 A1 | 1/2003 | Tahara et al. |
| 2003/0039308 A1 | 2/2003 | Wu et al. |
| 2003/0053537 A1 | 3/2003 | Kim et al. |
| 2003/0099292 A1 | 5/2003 | Wang et al. |
| 2003/0099294 A1 | 5/2003 | Wang et al. |
| 2003/0112864 A1 | 6/2003 | Karczewicz et al. |
| 2003/0113026 A1 | 6/2003 | Srinivasan et al. |
| 2003/0142748 A1 | 7/2003 | Tourapis |
| 2003/0142751 A1 | 7/2003 | Hannuksela |
| 2003/0156646 A1 | 8/2003 | Hsu et al. |
| 2003/0202590 A1 | 10/2003 | Gu et al. |
| 2003/0206589 A1 | 11/2003 | Jeon |
| 2004/0001546 A1 | 1/2004 | Tourapis et al. |
| 2004/0008899 A1 | 1/2004 | Tourapis et al. |
| 2004/0047418 A1 | 3/2004 | Tourapis et al. |
| 2004/0101059 A1 | 5/2004 | Joch et al. |
| 2004/0136457 A1 | 7/2004 | Funnell et al. |
| 2004/0139462 A1 | 7/2004 | Hannuksela et al. |
| 2004/0141651 A1 | 7/2004 | Hara et al. |
| 2004/0146109 A1 | 7/2004 | Kondo et al. |
| 2004/0228413 A1 | 11/2004 | Hannuksela |
| 2004/0234143 A1 | 11/2004 | Hagai et al. |
| 2005/0013497 A1 | 1/2005 | Hsu et al. |
| 2005/0013498 A1 | 1/2005 | Srinivasan |
| 2005/0036759 A1 | 2/2005 | Lin et al. |
| 2005/0053137 A1 | 3/2005 | Holcomb |
| 2005/0053147 A1 | 3/2005 | Mukerjee et al. |
| 2005/0053149 A1 | 3/2005 | Mukerjee et al. |
| 2005/0100093 A1 | 5/2005 | Holcomb |
| 2005/0129120 A1 | 6/2005 | Jeon |
| 2005/0135484 A1 | 6/2005 | Lee |
| 2005/0147167 A1 | 7/2005 | Dumitras et al. |
| 2005/0185713 A1 | 8/2005 | Winger et al. |
| 2005/0207490 A1 | 9/2005 | Wang |
| 2005/0249291 A1 | 11/2005 | Gordon et al. |
| 2005/0254584 A1 | 11/2005 | Kim et al. |
| 2006/0013307 A1 | 1/2006 | Olivier et al. |
| 2006/0072662 A1 | 4/2006 | Tourapis et al. |
| 2006/0120464 A1 | 6/2006 | Hannuksela |
| 2006/0280253 A1 | 12/2006 | Tourapis et al. |
| 2007/0064801 A1 | 3/2007 | Wang et al. |
| 2007/0177674 A1 | 8/2007 | Yang |
| 2008/0043845 A1 | 2/2008 | Nakaishi |
| 2008/0069462 A1 | 3/2008 | Abe |
| 2008/0075171 A1 | 3/2008 | Suzuki |
| 2008/0117985 A1 | 5/2008 | Chen et al. |
| 2009/0002379 A1 | 1/2009 | Baeza et al. |
| 2009/0003446 A1 | 1/2009 | Wu et al. |
| 2009/0003447 A1 | 1/2009 | Christoffersen et al. |
| 2009/0238269 A1 | 9/2009 | Pandit et al. |
| 2012/0213286 A1 | 8/2012 | Wu et al. |

FOREIGN PATENT DOCUMENTS

| | | |
|---|---|---|
| EP | 0 526 163 | 2/1993 |
| EP | 0 535 746 | 4/1993 |
| EP | 0 540 350 | 5/1993 |
| EP | 0 588 653 | 3/1994 |
| EP | 0 614 318 | 9/1994 |

(56) References Cited

FOREIGN PATENT DOCUMENTS

| | | |
|---|---|---|
| EP | 0 625 853 | 11/1994 |
| EP | 0 771 114 | 5/1997 |
| EP | 0 782 343 | 7/1997 |
| EP | 0 786 907 | 7/1997 |
| EP | 0 830 029 | 3/1998 |
| EP | 0 863 673 | 9/1998 |
| EP | 0 863 674 | 9/1998 |
| EP | 0 863 675 | 9/1998 |
| EP | 0 874 526 | 10/1998 |
| EP | 0 884 912 | 12/1998 |
| EP | 0 901 289 | 3/1999 |
| EP | 0 944 245 | 9/1999 |
| EP | 1 006 732 | 7/2000 |
| EP | 1335609 | 8/2003 |
| EP | 1369820 | 3/2004 |
| EP | 1418762 | 5/2004 |
| EP | 1 427 216 | 6/2004 |
| GB | 2328337 | 2/1999 |
| GB | 2332115 | 6/1999 |
| GB | 2343579 | 5/2000 |
| JP | 61-205086 | 9/1986 |
| JP | 1869940 | 9/1986 |
| JP | 62 213 494 | 9/1987 |
| JP | 3-001688 | 1/1991 |
| JP | 3 129 986 | 3/1991 |
| JP | 05-137131 | 6/1993 |
| JP | 6 078 298 | 3/1994 |
| JP | 6-078295 | 3/1994 |
| JP | 06-276481 | 9/1994 |
| JP | 06-276511 | 9/1994 |
| JP | 6-292188 | 10/1994 |
| JP | 07-274171 | 10/1995 |
| JP | 07-274181 | 10/1995 |
| JP | 08-140099 | 5/1996 |
| JP | 08-251601 | 9/1996 |
| JP | 09-121355 | 5/1997 |
| JP | 09-322163 | 12/1997 |
| JP | 10056644 | 2/1998 |
| JP | 10-224800 | 8/1998 |
| JP | 11-055672 | 2/1999 |
| JP | 11-088888 | 3/1999 |
| JP | 11 136683 | 5/1999 |
| JP | 11-164305 | 6/1999 |
| JP | 2000-513167 | 10/2000 |
| JP | 2000-307672 | 11/2000 |
| JP | 2000-308064 | 11/2000 |
| JP | 2001-025014 | 1/2001 |
| JP | 2002-118598 | 4/2002 |
| JP | 2002-121053 | 4/2002 |
| JP | 2002-156266 | 5/2002 |
| JP | 2002-177889 | 6/2002 |
| JP | 2002-193027 | 7/2002 |
| JP | 2002-204713 | 7/2002 |
| JP | 2003-513565 | 4/2003 |
| JP | 2004-208259 | 7/2004 |
| JP | 2004-228259 | 8/2004 |
| RU | 2182727 C2 | 5/2002 |
| WO | WO 00/33581 | 8/2000 |
| WO | WO 01/95633 | 12/2001 |
| WO | WO 02/37859 | 5/2002 |
| WO | WO 02/43399 | 5/2002 |
| WO | WO 02/062074 | 8/2002 |
| WO | WO 03/026296 | 3/2003 |
| WO | WO 03/047272 | 6/2003 |
| WO | WO 03/090473 | 10/2003 |
| WO | WO 03/090475 | 10/2003 |
| WO | WO 2005/004491 | 1/2005 |
| WO | WO 2008/023967 | 2/2008 |

OTHER PUBLICATIONS

U.S. Appl. No. 60/488,710, filed Jul. 18, 2003, Srinivasan et al.
U.S. Appl. No. 60/501,081, filed Sep. 7, 2003, Srinivasan et al.
Abe et al., "Clarification and Improvement of Direct Mode," JVT-D033, 9 pp. (document marked Jul. 16, 2002).
Anonymous, "DivX Multi Standard Video Encoder," 2 pp. (document marked Nov. 2005).
Chalidabhongse et al., "Fast motion vector estimation using multiresolution spatio-temporal correlations," *IEEE Transactions on Circuits and Systems for Video Technology*, pp. 477-488 (Jun. 1997).
Chujoh et al., "Verification result on the combination of spatial and temporal," JVT-E095, 5 pp. (Oct. 2002).
Communication pursuant to Article 94(3) EPC dated Nov. 26, 2015, from European Patent Application No. 10016061.3, 4 pp.
Communication under Rule 71(3) EPC dated Jan. 4, 2017, from European Patent Application No. 10016061.3, 10 pp.
Decision to Grant dated Jul. 19, 2013, from Japanese Patent Application No. 2010-042115, 3 pp. (English translation not available).
Decision to Grant dated May 8, 2017, from European Patent Application No. 10016061.3, 1 p.
Ericsson, "Fixed and Adaptive Predictors for Hybrid Predictive/Transform Coding," *IEEE Transactions on Comm.*, vol. COM-33, No. 12, pp. 1291-1302 (1985).
European Search Report dated Sep. 6, 2010, from European Patent Application No. EP 030000608.4, 5 pp.
European Search Report dated Sep. 6, 2010, from European Patent Application No. EP 10002808.3, 5 pp.
European Search Report dated Apr. 19, 2011, from European Patent Application No. 10 01 6061.3, 7 pp.
Examination Report dated Oct. 8, 2010, from European Patent Application No. EP 10002808.3, 6 pp.
Examination Report dated May 29, 2012, from European Patent Application No. 03000608.4, 7 pp.
Examination Report dated May 29, 2012, from European Patent Application No. 10002808.3, 6 pp.
Examination Report dated May 29, 2012, from European Patent Application No. 10016061.3, 5 pp.
Examination Report dated Mar. 23, 2015, from European Patent Application No. 03000608.4, 4 pp.
Examination Report dated Mar. 23, 2015, from European Patent Application No. 10002808.3, 4 pp.
Examination Report dated Mar. 23, 2015, from European Patent Application No. 10016061.3, 4 pp.
Flierl et al., "Multihypothesis Motion Estimation for Video Coding," *Proc. DCC*, 10 pp. (Mar. 2001).
Fogg, "Survey of Software and Hardware VLC Architectures," *SPIE*, vol. 2186, pp. 29-37 (Feb. 9-10 1994).
Girod, "Efficiency Analysis of Multihypothesis Motion-Compensated Prediction for Video Coding," *IEEE Transactions on Image Processing*, vol. 9, No. 2, pp. 173-183 (Feb. 2000).
Girod, "Motion-Compensation: Visual Aspects, Accuracy, and Fundamental Limits," *Motion Analysis and Image Sequence Processing*, Kluwer Academic Publishers, pp. 125-152 (1993).
Grigoriu, "Spatio-temporal compression of the motion field in video coding," 2001 IEEE Fourth Workshop on Multimedia Signal Processing, pp. 129-134 (Oct. 2001).
Gu et al., "Introducing Direct Mode P-picture (DP) to reduce coding complexity," Joint Video Team (JVT) of ISO/IEC MPEG & ITU-T VCEG, Document No. JVT-0044, 10 pp. (Mar. 2002).
Horn et al., "Estimation of Motion Vector Fields for Multiscale Motion Compensation," *Proc. Picture Coding Symp. (PCS 97)*, pp. 141-144 (Sep. 1997).
Hsu et al., "A Low Bit-Rate Video Codec Based on Two-Dimensional Mesh Motion Compensation with Adaptive Interpolation," *IEEE Transactions on Circuits and Systems for Video Technology*, vol. 11, No. 1, pp. 111-117 (Jan. 2001).
Huang et al., "Hardware architecture design for variable block size motion estimation in MPEG-4 AVC/JVT/ITU-T H.264" *Proc. of the 2003 Int'l Symposium on Circuits & Sys.* (ISCAS '03), vol. 2, pp. 796-799 (May 2003).
Ismaeil et al., "Efficient Motion Estimation Using Spatial and Temporal Motion Vector Prediction," *IEEE Int'l Conf. on Image Processing*, pp. 70-74 (Oct. 1999).
ISO/IEC, "MPEG-4 Video Verification Model Version 18.0," ISO/IEC JTC1/SC29/WG11 N3908, Pisa, pp. 1-10, 299-311 (Jan. 2001).

(56) References Cited

OTHER PUBLICATIONS

ISO/IEC, "ISO/IEC 11172-2: Information Technology—Coding of Moving Pictures and Associated Audio for Storage Media at up to About 1.5 Mbit/s," 122 pp. (Aug. 1993).
ISO/IEC, "Information Technology—Coding of Audio-Visual Objects: Visual, ISO/IEC 14496-2, Committee Draft," 330 pp. (Mar. 1998).
ISO/IEC, "MPEG-4 Video Verification Model Version 10.0," ISO/IEC JTC1/SC29/WG11, MPEG98/N1992, 305 pp. (Feb. 1998).
ITU—Q15-F-24, "MVC Video Codec—Proposal for H.26L," Study Group 16, Video Coding Experts Group (Question 15), 28 pp. (document marked as generated in Oct. 1998).
Itu-T, "ITU-T Recommendation H.261: Video Codec for Audiovisual Services at p × 64 kbits," 28 pp. (Mar. 1993).
ITU-T, "ITU-T Recommendation H.262: Information Technology—Generic Coding of Moving Pictures and Associated Audio Information: Video," 218 pp. (Jul. 1995).
ITU-T, "ITU-T Recommendation H.263: Video Coding for Low Bit Rate Communication," 167 pp. (Feb. 1998).
Jeon et al., "B picture coding for sequence with repeating scene changes," JVT-C120, 9 pp. (document marked May 1, 2002).
Jeon, "Clean up for temporal direct mode," JVT-E097, 13 pp. (Oct. 2002).
Jeon, "Direct mode in B pictures," JVT-D056, 10 pp. (Jul. 2002).
Jeon, "Motion vector prediction and prediction signal in B pictures," JVT-D057, 5 pp. (Jul. 2002).
Ji et al., "New Bi-Prediction Techniques for B Pictures Coding," *IEEE Int'l Conf. on Multimedia and Expo*, pp. 101-104 (Jun. 2004).
Joint Video Team (JVT) of ISO/IEC MPEG and ITU-T VCEG, Working Draft No. 2, Revision 2 (WD-2), JVT-B118r2, 106 pp. (Jan. 2002).
Joint Video Team (JVT) of ISO/IEC MPEG and ITU-T VCEG, Working Draft No. 2, Revision 0 (WD-2), JVT-B118r1, 105 pp. (Jan. 2002).
Joint Video Team of ISO/IEC MPEG and ITU-T VCEG, "Text of Committee Draft of Joint Video Specification (ITU-T Rec. H.264, ISO/IEC 14496-10 AVC)," Document JVT-C167, 142 pp. (May 2002).
Joint Video Team of ISO/IEC MPEG and ITU-T VCEG, "Joint Final Committee Draft (JFCD) of Joint Video Specification (ITU-T Recommendation H.264, ISO/IEC 14496-10 AVC," JVT-D157 (Aug. 2002).
Joint Video Team (JVT) of ISO/IEC MPEG and ITU-T VCEG, "Joint Model No. 1, Revision 1 (JM-1r1)," JVT-A003r1, Pattaya, Thailand, 80 pp. (Dec. 2001) [document marked "Generated: Jan. 18, 2002"].
Joint Video Team (JVT) of ISO/IEC MPEG and ITU-T VCEG, "Study of Final Committee Draft of Joint Video Specification," JVT-F100, Awaji Island, 242 pp. (Dec. 2002).
Kadono et al., "Memory Reduction for Temporal Technique of Direct Mode," JVT-E076, 12 pp. (Oct. 2002).
Ko et al., "Fast Intra-Mode Decision Using Inter-Frame Correlation for H.264/AVC," Proc. IEEE ISCE 2008, 4 pages (Apr. 2008).
Kondo et al., "New Prediction Method to Improve B-picture Coding Efficiency," VCEG-O26, 9 pp. (document marked Nov. 26, 2001).
Kondo et al., "Proposal of Minor Changes to Multi-frame Buffering Syntax for Improving Coding Efficiency of B-pictures," JVT-B057, 10 pp. (document marked Jan. 23, 2002).
Konrad et al., "On Motion Modeling and Estimation for Very Low Bit Rate Video Coding," *Visual Comm. & Image Processing (VCIP '95)*, 12 pp. (May 1995).
Kossentini et al., "Predictive RD Optimized Motion Estimation for Very Low Bit-rate Video Coding," IEEE J. on Selected Areas in Communications, vol. 15, No. 9 pp. 1752-1763 (Dec. 1997).
Ku et al., "Investigation of a Visual Telephone Prototyping on Personal Computers," *IEEE Trans. on Consumer Electronics*, vol. 42, No. 3, pp. 750-759 (Aug. 1996).
Lainema et al., "Skip Mode Motion Compensation," Joint Video Team (JVT) of ISO/IEC MPEG & ITU-T VCEG (ISO/IEC JTC1/SC29/WG11 and ITU-T SG16 Q.6), Document JVT-C027, 8 pp. (May 2002).

Microsoft Corporation, "Microsoft Debuts New Windows Media Players 9 Series, Redefining Digital Media on the PC," 4 pp. (Sep. 4, 2002) [Downloaded from the World Wide Web on May 14, 2004].
Mook, "Next-Gen Windows Media Player Leaks to the Web," *BetaNews*, 17 pp. (Jul. 19, 2002) [Downloaded from the World Wide Web on Aug. 8, 2003].
Notice of Allowance dated Jan. 27, 2015, from Japanese Patent Application No. 2012-281261, 3 pp.
Notice of Allowance dated Sep. 15, 2015, from Japanese Patent Application No. 2014-148792, 3 pp. [No English translation available].
Notice of Preliminary Rejection dated Jun. 30, 2009, from Korean Patent Application No. 10-2003-0004782, 5 pp.
Notice of Reasons for Rejection dated May 26, 2015, from Japanese Patent Application No. 2014-148792, 6 pp.
Notice of Rejection dated Dec. 26, 2008, from Japanese Patent Application No. 2003-018020, 14 pp.
Notice of Rejection dated Oct. 30, 2009, from Japanese Patent Application No. 2003-018020, 6 pp.
Notice of Allowance dated May 21, 2010, from Japanese Patent Application No. 2003-018020, 6 pp.
Notice of Rejection dated Jun. 22, 2012, from Japanese Patent Application No. 2010-042115, 11 pp.
Office Action dated Jan. 21, 2014, from Japanese Patent Application No. 2012-281261, 6 pp.
Panusopone et al., "Direct Prediction for Predictive (P) Picture in Field Coding.mode," Joint Video Team (JVT) of ISO/IEC MPEG & ITU-T VCEG, Document JVT-D046, 8 pp. (Jul. 2002).
Partial European Search Report dated Mar. 10, 2011, from European Patent Application No. EP 030000608.4, 7 pp.
Pourazad et al., "An H.264-based Video Encoding Scheme for 3D TV," EURASIP European Signal Processing Conference—EUSIPCO, Florence, Italy, 5 pages (Sep. 2006).
Printouts of FTP directories from http://ftp3.itu.ch, 8 pp. (downloaded from the World Wide Web on Sep. 20, 2005).
Reader, "History of MPEG Video Compression—Ver. 4.0," 99 pp. (document marked Dec. 16, 2003).
Schwarz et al., "Tree-structured macroblock partition," ITU-T SG16/Q.6 VCEG-O17, 6 pp. (Dec. 2001).
Schwarz et al., "Core Experiment Results on Improved Macroblock Prediction Modes," Joint Video Team (JVT) of ISO/IEC MPEG & ITU-T VCEG (ISO/IEC JTC1/SC29/WG11 and ITU-T SG16 Q.6), Document JVT-B054, 10 pp. (Jan.-Feb. 2002).
Sullivan et al., "The H.264/AVC Advanced Video Coding Standard: Overview and Introduction to the Fidelity Range Extensions," 21 pp. (Aug. 2004).
Suzuki, "Handling of reference pictures and MVs for direct mode," JVT-D050, 11 pp. (Jul. 2002).
Suzuki et al., "Study of Direct Mode," JVT-E071 r1, 7 pp. (Oct. 2002).
"The TML Project Web-Page and Archive," (including pages of code marked "image.cpp for H.26L decoder, Copyright 1999" and "image.c"), 24 pp. (document marked Sep. 2001).
Tourapis et al., "B picture and ABP Finalization," JVT-E018, 2 pp. (Oct. 2002).
Tourapis et al., "Direct Mode Coding for Bipredictive Slices in the H.264 Standard," *IEEE Trans. on Circuits and Systems for Video Technology*, vol. 15, No. 1, pp. 119-126 (Jan. 2005).
Tourapis et al., "Direct Prediction for Predictive (P) and Bidirectionally Predictive (B) frames in Video Coding ," Joint Video Team (JVT) of ISO/IEC MPEG & ITU-T VCEG (ISO/IEC JTC1/SC29/WG11 and ITU-T SG16 Q.6), Document JVT-C128, 11 pp. (May 2002).
Tourapis et al., "Motion Vector Prediction in Bidirectionally Predictive (B) frames with regards to Direct Mode," Joint Video Team (JVT) of ISO/IEC MPEG & ITU-T VCEG (ISO/IEC JTC1/SC29/WG11 and ITU-T SG16 Q.6), Document JVT-C127, 7 pp. (May 2002).
Tourapis et al., "Timestamp Independent Motion Vector Prediction for P and B frames with Division Elimination," Joint Video Team (JVT) of ISO/IEC MPEG & ITU-T VCEG (ISO/IEC JTC1/SC29/WG11 and ITU-T SG16 Q.6), Document JVT-D040, 18 pp. (Jul. 2002).

(56) References Cited

OTHER PUBLICATIONS

Tourapis et al., "Performance Comparison of Temporal and Spatial Direct mode," Joint Video Team (JVT) of ISO/IEC MPEG & ITU-T VCEG (ISO/IEC JTC1/SC29/WG11 and ITU-T SG16 Q.6), Document JVT-E026, 7 pp. (Oct. 2002).

Tourapis et al., "Temporal Interpolation of Video Sequences Using Zonal Based Algorithms," *IEEE*, pp. 895-898 (Oct. 2001).

Wang et al., "Adaptive frame/field coding for JVT Video Coding," ITU-T SG16 Q.6 JVT-B071, 24 pp. (Jan. 2002).

Wang et al., "Interlace Coding Tools for H.26L Video Coding," ITU-T SG16/Q.6 VCEG-O37, pp. 1-20 (Dec. 2001).

Wiegand et al., "Motion-compensating Long-term Memory Prediction," *Proc. Int'l Conf. on Image Processing*, 4 pp. (Oct. 1997).

Wiegand et al., "Long-term Memory Motion Compensated Prediction," IEEE Transactions on Circuits & Systems for Video Technology, vol. 9, No. 1, pp. 70-84 (Feb. 1999).

Wiegand, "H.26L Test Model Long-Term No. 9 (TML-9) draft 0," ITU-Telecommunications Standardization Sector, Study Group 16, VCEG-N83, 74 pp. (Dec. 2001).

Wien, "Variable Block-Size Transforms for Hybrid Video Coding," Dissertation, 182 pp. (Feb. 2004).

Winger et al., "HD Temporal Direct-Mode Verification & Text," JVT-E037, 8 pp. (Oct. 2002).

Wu et al., "Joint estimation of forward and backward motion vectors for interpolative prediction of video," *IEEE Transactions on Image Processing*, vol. 3, No. 5, pp. 684-687 (Sep. 1994).

Yu et al., "Two-Dimensional Motion Vector Coding for Low Bitrate Videophone Applications," *Proc. Int'l Conf. on Image Processing*, Los Alamitos, US, pp. 414-417, IEEE Comp. Soc. Press (Oct. 1995).

Communication pursuant to Article 94(3) EPC dated Jan. 4, 2019, from European Patent Application No. 10002808.3, 6 pp.

\* cited by examiner

MacroBlock*x* at time t−1 500    MacroBlock*x* at time t 502

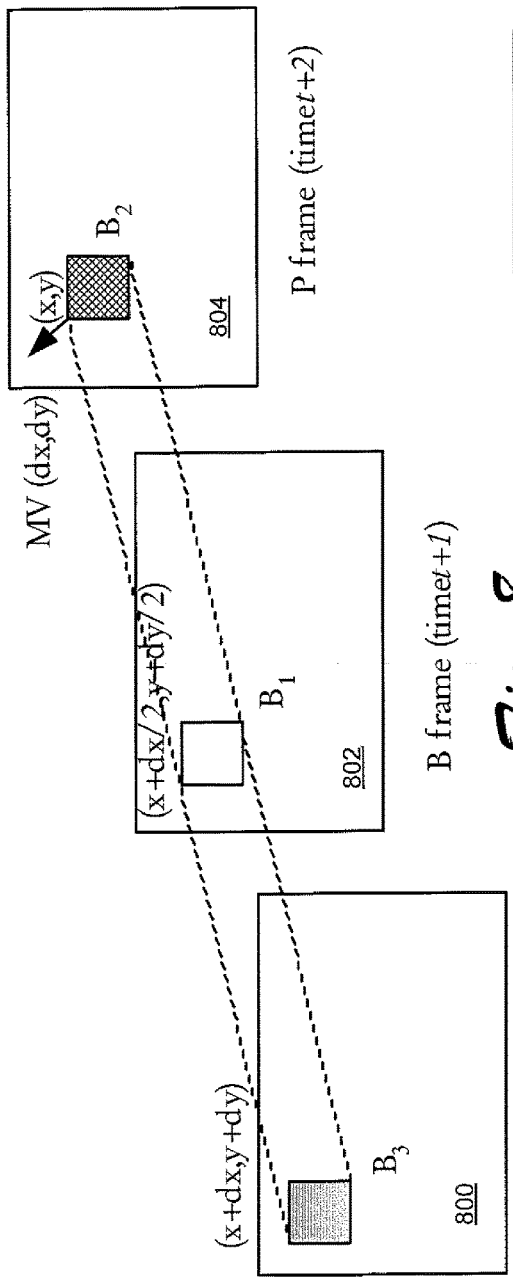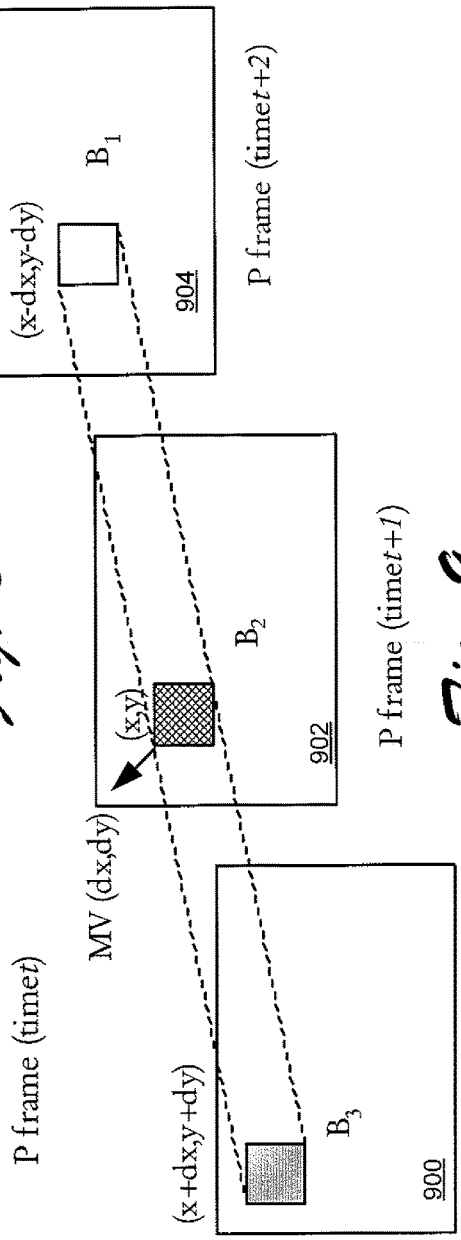
Fig. 8
Fig. 9

VIDEO CODING

RELATED PATENT APPLICATIONS

This patent application is a continuation of U.S. patent application Ser. No. 13/850,178, filed Mar. 25, 2013, which is a continuation of U.S. patent application Ser. No. 12/474,821, filed May 29, 2009, now U.S. Pat. No. 8,406,300, which is a divisional of U.S. patent application Ser. No. 11/275,103, filed Dec. 9, 2005, now U.S. Pat. No. 7,646,810, which is a continuation of U.S. patent application Ser. No. 10/186,284, filed Jun. 27, 2002, now U.S. Pat. No. 7,003,035, and hereby incorporated by reference which claims the benefit of: (1) U.S. Provisional Patent Application No. 60/376,005, filed Apr. 26, 2002; and (2) U.S. Provisional Patent Application No. 60/352,127, filed Jan. 25, 2002.

BACKGROUND

The motivation for increased coding efficiency in video coding has led to the adoption in the Joint Video Team (JVT) (a standards body) of more refined and complicated models and modes describing motion information for a given macroblock. These models and modes tend to make better advantage of the temporal redundancies that may exist within a video sequence. See, for example, ITU-T, Video Coding Expert Group (VCEG), "JVT Coding—(ITU-T H.26L & ISO/IEC JTC1 Standard)—Working Draft Number 2 (WD-2)", ITU-T JVT-B118, March 2002; and/or Heiko Schwarz and Thomas Wiegand, "Tree-structured macroblock partition", Doc. VCEG-N17, December 2001.

The recent models include, for example, multi-frame indexing of the motion vectors, increased sub-pixel accuracy, multi-referencing, and tree structured macroblock and motion assignment, according to which different sub areas of a macroblock are assigned to different motion information. Unfortunately these models tend to also significantly increase the required percentage of bits for the encoding of motion information within sequence. Thus, in some cases the models tend to reduce the efficacy of such coding methods.

Even though, in some cases, motion vectors are differentially encoded versus a spatial predictor, or even skipped in the case of zero motion while having no residue image to transmit, this does not appear to be sufficient for improved efficiency.

It would, therefore, be advantageous to further reduce the bits required for the encoding of motion information, and thus of the entire sequence, while at the same time not significantly affecting quality.

Another problem that is also introduced by the adoption of such models and modes is that of determining the best mode among all possible choices, for example, given a goal bitrate, encoding/quantization parameters, etc. Currently, this problem can be partially solved by the use of cost measures/penalties depending on the mode and/or the quantization to be used, or even by employing Rate Distortion Optimization techniques with the goal of minimizing a Lagrangian function.

Such problems and others become even more significant, however, in the case of Bidirectionally Predictive (B) frames where a macroblock may be predicted from both future and past frames. This essentially means that an even larger percentage of bits may be required for the encoding of motion vectors.

Hence, there is a need for improved method and apparatuses for use in coding (e.g., encoding and/or decoding) video data.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, improved video coding is described to encode video data within a sequence of video frames. To this end, at least a portion of a reference frame is encoded to include motion information associated with the portion of the reference frame. At least a portion of a predictable frame that includes video data predictively correlated to said portion of said reference frame is defined based on the motion information. At least said portion of the predictable frame is encoded without including corresponding motion information and including mode identifying data. The mode identifying data indicate that the encoded portion of the predictable frame can be directly derived using at least the motion information associated with the portion of the reference frame

BRIEF DESCRIPTION OF THE DRAWINGS

The present invention is illustrated by way of example and not limitation in the figures of the accompanying drawings. The same numbers are used throughout the figures to reference like components and/or features.

FIG. 8 is an illustrative diagram depicting a Direct Pixel Projection technique suitable for use in P Frame coding, in accordance with certain exemplary implementations of the present invention.

FIG. 9 is a block diagram depicting an exemplary conventional video encoder.

DETAILED DESCRIPTION

Figure 1:
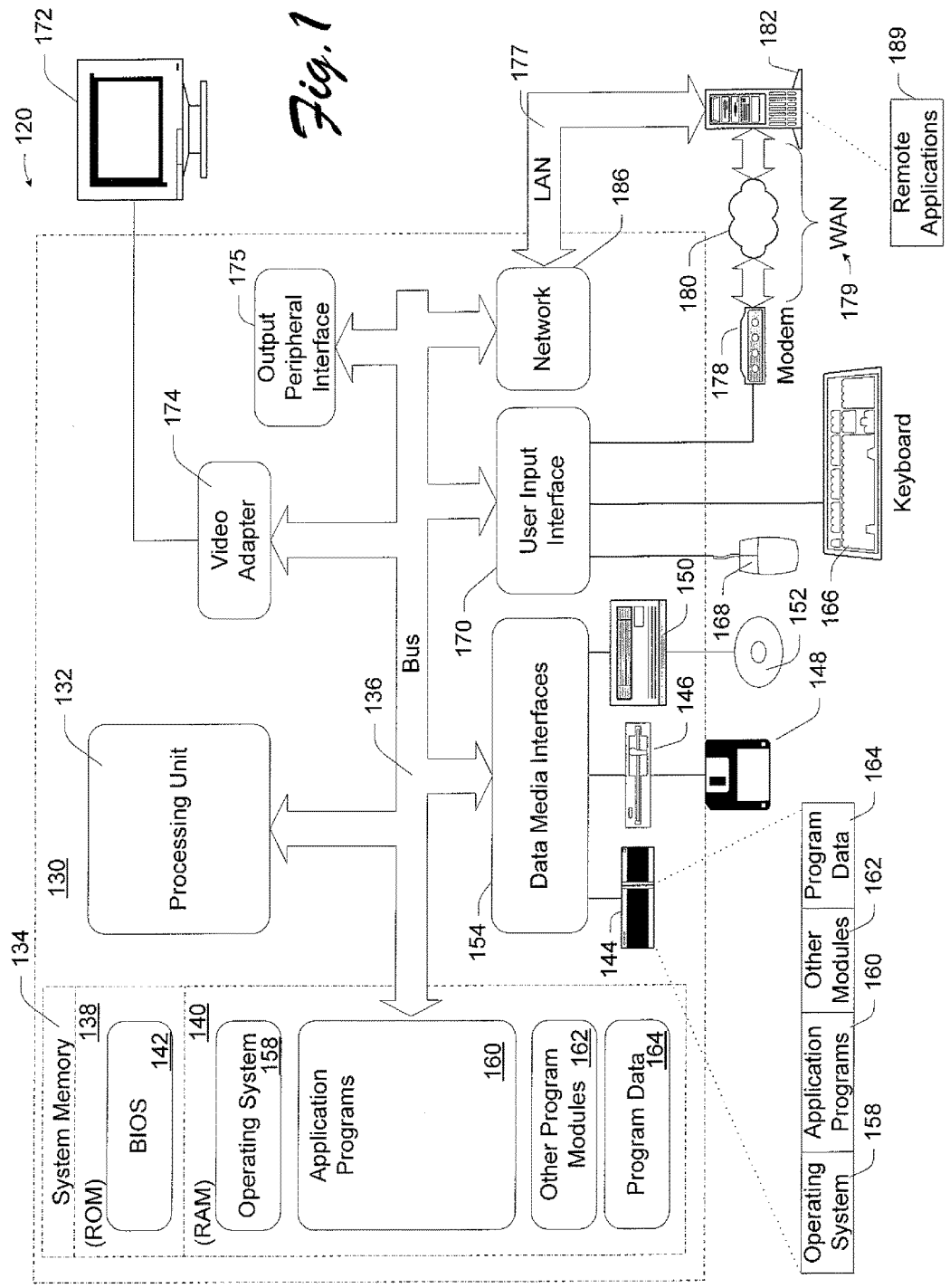
FIG. 1 is a block diagram depicting an exemplary computing environment that is suitable for use with certain implementations of the present invention.

In accordance with certain aspects of the present invention, methods and apparatuses are provided for coding (e.g., encoding and/or decoding) video data. The methods and apparatuses can be configured to enhance the coding efficiency of "interlace" or progressive video coding streaming technologies. In certain implementations, for example, with regard to the current H.26L standard, so called "P-frames" have been significantly enhanced by introducing several additional macroblock Modes. In some cases it may now be necessary to transmit up to 16 motion vectors per macroblock. Certain aspects of the present invention provide a way of encoding these motion vectors. For example, as described below, Direct P prediction techniques can be used to select the motion vectors of collocated pixels in the previous frame.

While these and other exemplary methods and apparatuses are described, it should be kept in mind that the techniques of the present invention are not limited to the examples described and shown in the accompanying drawings, but are also clearly adaptable to other similar existing and future video coding schemes, etc.

Before introducing such exemplary methods and apparatuses, an introduction is provided in the following section for suitable exemplary operating environments, for example, in the form of a computing device and other types of devices/appliances.

Exemplary Operational Environments:

Turning to the drawings, wherein like reference numerals refer to like elements, the invention is illustrated as being implemented in a suitable computing environment. Although not required, the invention will be described in the general context of computer-executable instructions, such as program modules, being executed by a personal computer.

Generally, program modules include routines, programs, objects, components, data structures, etc. that perform particular tasks or implement particular abstract data types. Those skilled in the art will appreciate that the invention may be practiced with other computer system configurations, including hand-held devices, multi-processor systems, microprocessor based or programmable consumer electronics, network PCs, minicomputers, mainframe computers, portable communication devices, and the like.

The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described systems, apparatuses and methods may be implemented. Exemplary computing environment 120 is only one example of a suitable computing environment and is not intended to suggest any limitation as to the scope of use or functionality of the improved methods and systems described herein. Neither should computing environment 120 be interpreted as having any dependency or requirement relating to any one or combination of components illustrated in computing environment 120.

The improved methods and systems herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures, By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and systems described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
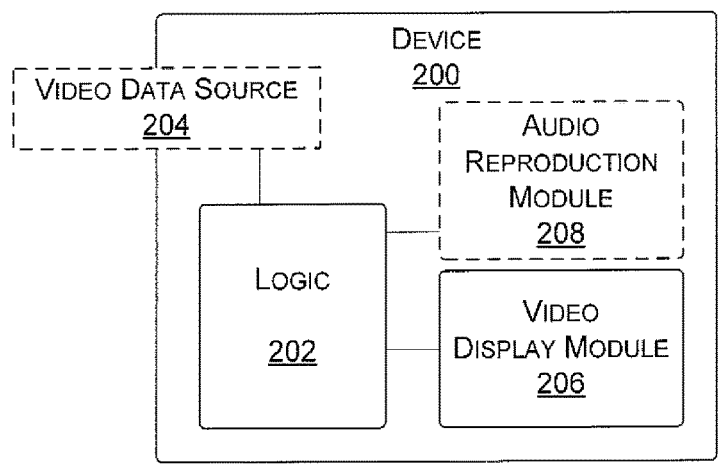
FIG. 2 is a block diagram depicting an exemplary representative device that is suitable for use with certain implementations of the present invention.

Attention is now drawn to FIG. 2, which is a block diagram depicting another exemplary device 200 that is also capable of benefiting from the methods and apparatuses disclosed herein. Device 200 is representative of any one or more devices or appliances that are operatively configured to process video and/or any related types of data in accordance with all or part of the methods and apparatuses described herein and their equivalents. Thus, device 200 may take the form of a computing device as in FIG. 1, or some other form, such as, for example, a wireless device, a portable communication device, a personal digital assistant, a video player, a television, a DVD player, a CD player, a karaoke machine, a kiosk, a digital video projector, a flat panel video display mechanism, a set-top box, a video game machine, etc. In this example, device 200 includes logic 202 configured to process video data, a video data source 204 configured to provide vide data to logic 202, and at least one display module 206 capable of displaying at least a portion of the video data for a user to view. Logic 202 is representative of hardware, firmware, software and/or any combination thereof. In certain implementations, for example, logic 202 includes a compressor/decompressor (codec), or the like. Video data source 204 is representative of any mechanism that can provide, communicate, output, and/or at least momentarily store video data suitable for processing by logic 202. Video reproduction source is illustratively shown as being within and/or without device 200. Display module 206 is representative of any mechanism that a user might view directly or indirectly and see the visual results of video data presented thereon. Additionally, in certain implementations, device 200 may also include some form or capability for reproducing or otherwise handling audio data associated with the video data. Thus, an audio reproduction module 208 is shown.

With the examples of FIGS. 1 and 2 in mind, and others like them, the next sections focus on certain exemplary methods and apparatuses that may be at least partially practiced using with such environments and with such devices.

Direct Prediction for Predictive (P) and Bidirectionally Predictive (B) Frames in Video Coding:

This section presents a new highly efficient Inter Macroblock type that can significantly improve coding efficiency especially for high/complex motion sequences. This Inter Macroblock new type takes advantage of the temporal and spatial correlations that may exist within frames at the macroblock level, and as a result can significantly reduce the bits required for encoding motion information while retaining or even improving quality.

Direct Prediction

The above mentioned problems and/or others are at least partially solved herein by the introduction of a "Direct Prediction Mode" wherein, instead of encoding the actual motion information, both forward and/or backward motion vectors are derived directly from the motion vectors used in the correlated macroblock of the subsequent reference frame.

Figure 3:
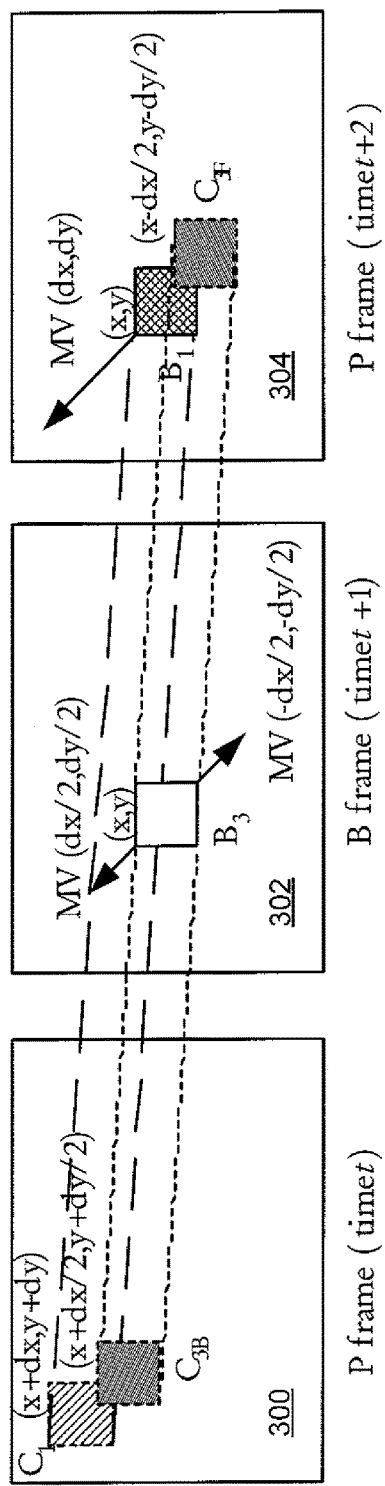
FIG. 3 is an illustrative diagram depicting a Direct Motion Projection technique suitable for use in B Frame coding, in accordance with certain exemplary implementations of the present invention.

This is illustrated, for example, in FIG. 3, which shows three video frames, namely a P frame 300, a B frame 302 and P frame 304, corresponding to times t, t+1, and t+2, respectively. Also illustrated in FIG. 3 are macroblocks within frames 300, 302 and 304 and exemplary motion vector (MV) information. Here, the frames have x and y coordinates associated with them. The motion vector information for B frame 302 is predicted (here, e.g., interpolated) from the motion vector information encoded for P frames 300 and 304. The exemplary technique is derived from the assumption that an object is moving with constant speed, and thus making it possible to predict its current position inside B frame 302 without having to transmit any motion vectors. While this technique may reduce the bitrate significantly for a given quality, it may not always be applied.

Figure 4:
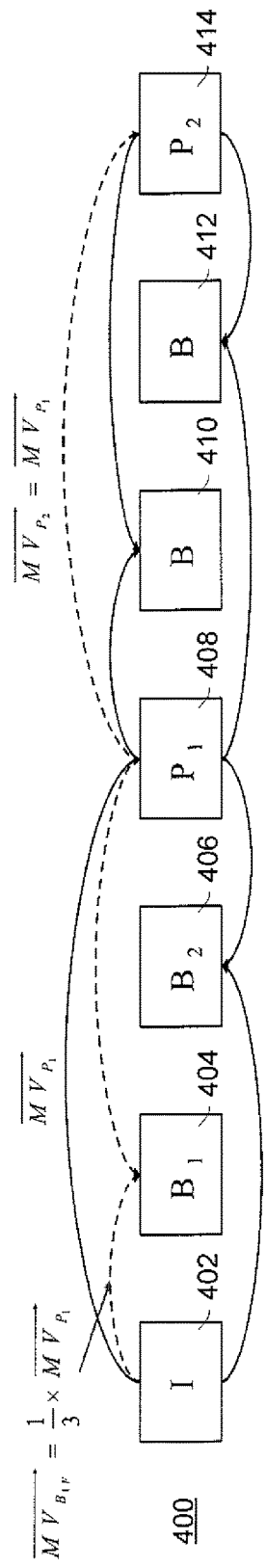
FIG. 4 is an illustrative diagram depicting a Direct P and B coding techniques within a sequence of video frames, in accordance with certain exemplary implementations of the present invention.

Introduced herein, in accordance with certain implementations of the present invention, is a new Inter Macroblock type is provided that can effectively exploit spatial and temporal correlations that may exist at the macroblock level and in particular with regard to the motion vector information of the macroblock. According to this new mode it is possible that a current macroblock may have motion that can be directly derived from previously decoded information (e.g., Motion Projection). Thus, as illustratively shown in FIG. 4, there may not be a need to transmit any motion vectors for a macroblock, but even for an entire frame. Here, a sequence 400 of video frames is depicted with solid arrows indicating coded relationships between frames and dashed lines indicating predictable macroblock relationships. Video frame 402 is an I frame, video frames 404, 406, 410, and 412 are B frames, and video frames 408 and 414 are P frames. In this example, if P frame 408 has a motion field described by $\overrightarrow{MF}_{406}$ the motion of the collocated macroblocks in pictures 404, 406, and 414 is also highly correlated. In particular, assuming that speed is in general constant on the entire frame and that frames 404 and 406 are equally spaced in time between frames 402 and 408, and also considering that for B frames both forward and backward motion vectors could be used, the motion fields in frame 404 could be equal to $\overrightarrow{MF}_{404}{}^{fw}=\frac{1}{3}\times\overrightarrow{MF}_{406}$ and $\overrightarrow{MF}_{404}{}^{bw}=-\frac{2}{3}\times\overrightarrow{MF}_{406}$ for forward and backward motion fields respectively. Similarly, for frame 408 the motion fields could be $\overrightarrow{MF}_{408}{}^{fw}=\frac{2}{3}\times\overrightarrow{MF}_{406}$ and $\overrightarrow{MF}_{408}{}^{bw}=-\frac{1}{3}\times\overrightarrow{MF}_{406}$ for forward and backward motion vectors respectively. Since 414 and 406 are equally spaced, then, using the same assumption, the collocated macroblock could have motion vectors $\overrightarrow{MF}_{416}=\overrightarrow{MF}_{406}$.

Figure 6:
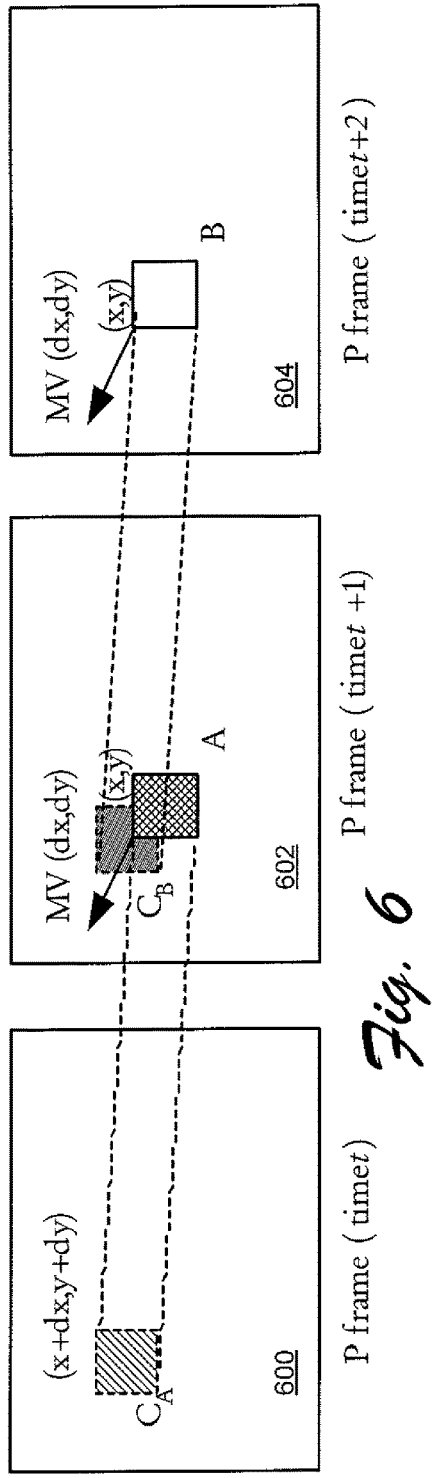
FIG. 6 is an illustrative diagram depicting the usage of acceleration information in Direct Motion Projection, in accordance with certain exemplary implementations of the present invention.

Similar to the Direct Mode in B frames, by again assuming that speed is constant, motion for a macroblock can be directly derived from the correlated macroblock of the reference frame. This is further illustrated in FIG. 6, for example, which shows three video frames, namely a P frame 600, a B frame 602 and P frame 604, corresponding to times t, t+1, and t+2, respectively. Here, the illustrated collocated macroblocks have similar if not identical motion information.

Figure 7:
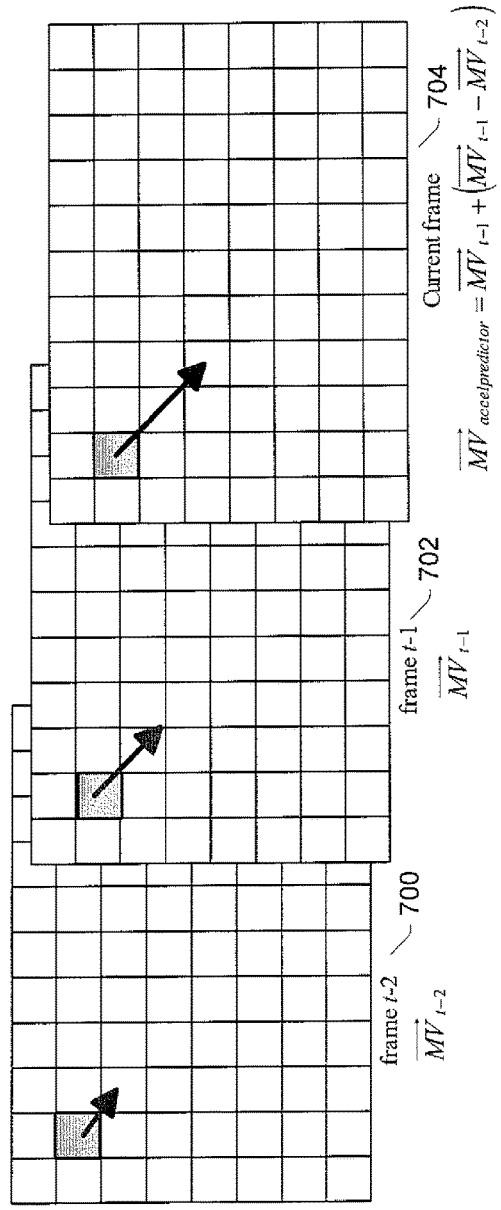
FIG. 7 is an illustrative diagram depicting a Direct Pixel Projection technique suitable for use in B Frame coding, in accordance with certain exemplary implementations of the present invention.

It is even possible to consider acceleration for refining such motion parameters, for example, see FIG. 7. Here, for example, three frames are shown, namely a current frame 704 at time t, and previous frames 702 (time t−1) and 700 (time t−2), with different acceleration information illustrated by different length motion vectors.

The process may also be significantly improved by, instead of considering motion projection at the macroblock level, taking into account that the pixels inside the previous image are possibly moving with a constant speed or a constant acceleration (e.g., Pixel Projection). As such, one may generate a significantly more accurate prediction of the current frame for B frame coding as illustrated, for example, in FIG. 8, and for P frame coding as illustrated, for example, in FIG. 9. FIG. 8, for example, shows three video frames, namely a P frame 800, a B frame 802 and P frame 804, corresponding to times t, t+1, and t+2, respectively. FIG. 9, for example, shows three video frames, namely a P frame 900, a B frame 902 and P frame 904, corresponding to times t, t+1, and t+2, respectively.

In certain implementations it is also possible to combine both methods together for even better performance.

In accordance with certain further implementations, motion can also be derived from spatial information, for example, using prediction techniques employed for the coding of motion vectors from the motion information of the surrounding macroblocks. Additionally, performance can also be further enhanced by combining these two different methods in a multi-hypothesis prediction architecture that does not require motion information to be transmitted. Consequently, such new macroblock types can achieve significant bitrate reductions while achieving similar or improved quality.

Figure 10:
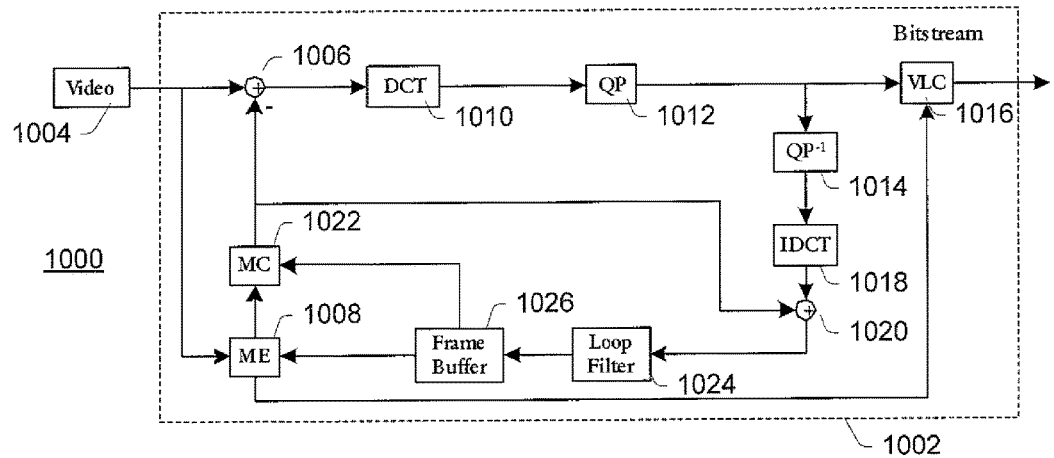
FIG. 10 is a block diagram depicting an exemplary conventional video decoder.

Exemplary Encoding Processes:

FIG. 10 illustrates an exemplary encoding environment 1000, having a conventional block based video encoder 1002, wherein a video data 1004 is provided to encoder 1002 and a corresponding encoded video data bitstream is output.

Video data 1004 is provided to a summation module 1006, which also receives as an input, the output from a motion compensation (MC) module 1022. The output from summation module 1006 is provided to a discrete cosine transform (DCT) module 1010. The output of DCT module 1010 is provided as an input to a quantization module (QP) 1012. The output of QP module 1012 is provided as an input to an inverse quantization module (QP$^{-1}$) 1014 and as an input to a variable length coding (VLC) module 1016. VLC module 1016 also receives as in input, an output from a motion estimation (ME) module 1008. The output of VLC module 1016 is an encoded video bitstream 1210.

The output of QP$^{-1}$ module 1014 is provided as in input to in inverse discrete cosine transform (DCT) module 1018. The output of 1018 is provided as in input to a summation module 1020, which has as another input, the output from MC module 1022. The output from summation module 1020 is provided as an input to a loop filter module 1024. The output from loop filter module 1024 is provided as an input to a frame buffer module 1026. One output from frame buffer module 1026 is provided as an input to ME module 1008, and another output is provided as an input to MC module 1022. Me module 1008 also receives as an input video data 1004. An output from ME 1008 is proved as an input to MC module 1022.

In this example, MC module 1022 receives inputs from ME module 1008. Here, ME is performed on a current frame against a reference frame. ME can be performed using various block sizes and search ranges, after which a "best"

parameter, using some predefined criterion for example, is encoded and transmitted (INTER coding). The residue information is also coded after performing DCT and QP. It is also possible that in some cases that the performance of ME does not produce a satisfactory result, and thus a macroblock, or even a subblock, could be INTRA encoded.

Figure 5:
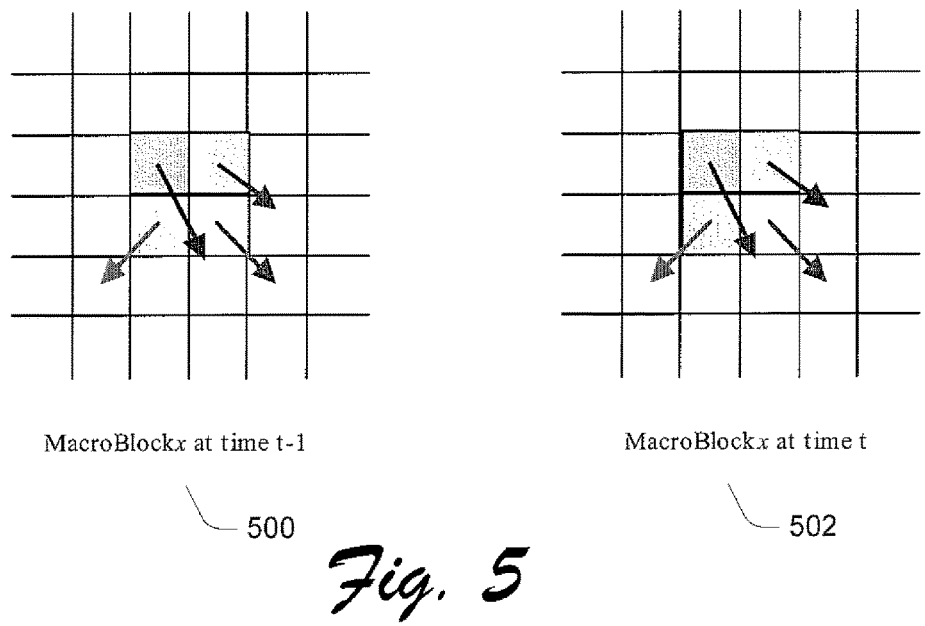
FIG. 5 is an illustrative diagram depicting Direct Motion Prediction for collocated macroblocks having identical motion information, in accordance with certain exemplary implementations of the present invention.
Figure 12:
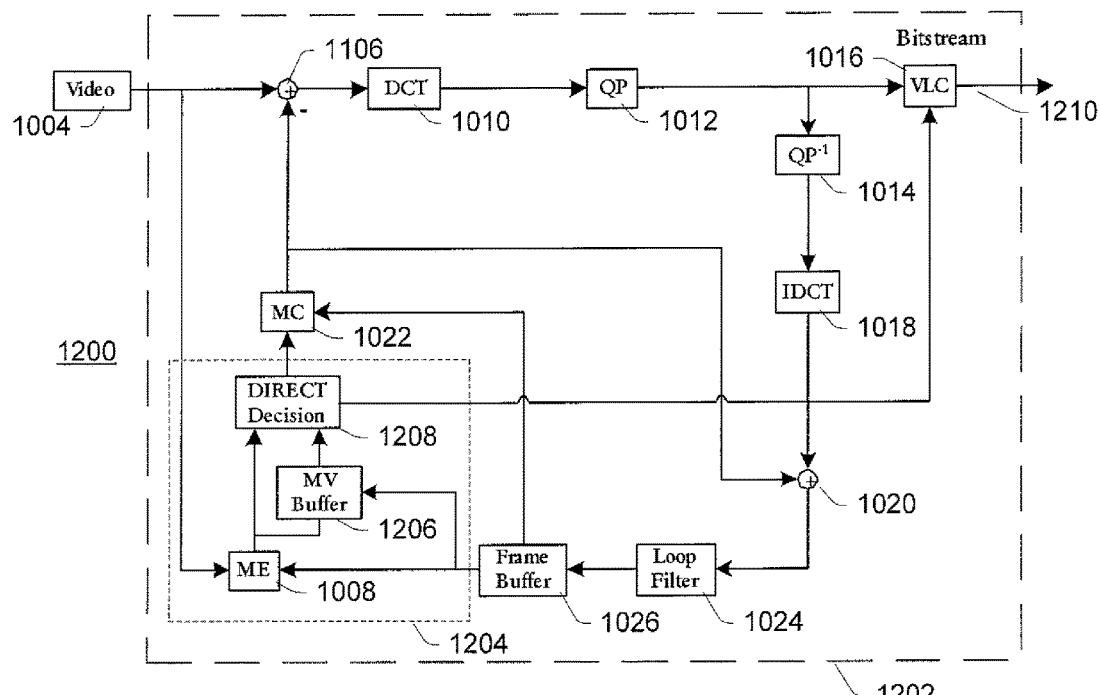
FIG. 12 is a block diagram depicting an exemplary improved video decoder using Direct Prediction, in accordance with certain exemplary implementations of the present invention.

Considering that motion information could be quite costly, the encoding process can be modified as in FIG. 12, in accordance with certain exemplary implementations of the present invention, to also consider in a further process the possibility that the motion vectors for a macroblock could be temporally and/or spatially predicted from previously encoded motion information. Such decisions, for example, can be performed using Rate Distortion Optimization techniques or other cost measures. Using such techniques/modes it may not be necessary to transmit detailed motion information, because such may be replaced with a Direct Prediction (Direct P) Mode, e.g., as illustrated in FIG. 5.

Motion can be modeled, for example, in any of the following models or their combinations: (1) Motion Projection (e.g., as illustrated in FIG. 3 for B frames and FIG. 6 for P frames); (2) Pixel Projection (e.g., as illustrated in FIG. 8 for B frames and FIG. 9 for P frames); (3) Spatial MV Prediction (e.g., median value of motion vectors of collocated macroblocks); (4) Weighted average of Motion Projection and Spatial Prediction; (5) or other like techniques.

Other prediction models (e.g. acceleration, filtering, etc.) may also be used. If only one of these models is to be used, then this should be common in both the encoder and the decoder. Otherwise, one may use submodes which will immediately guide the decoder as to which model it should use. Those skilled in the art will also recognize that multi-referencing a block or macroblock is also possible using any combination of the above models.

In FIG. 12, an improved video encoding environment 1200 includes a video encoder 1202 that receives video data 1004 and outputs a corresponding encoded video data bitstream.

Here, video encoder 1202 has been modified to include improvement 1204. Improvement 1204 includes an additional motion vector (MV) buffer module 1206 and a DIRECT decision module 1208, More specifically, as shown, MV buffer module 1206 is configured to receive as inputs, the output from frame buffer module 1026 and the output from ME module 1008. The output from MV buffer module 1206 is provided, along with the output from ME module 1008, as an input to DIRECT decision module 1208. The output from DIRECT decision module 1208 is then provided as an input to MC module 1022 along with the output from frame buffer module 1026.

For the exemplary architecture to work successfully, the Motion Information from the previously coded frame is stored intact, which is the purpose for adding MV buffer module 1206. MV buffer module 1206 can be used to store motion vectors. In certain implementations. MV buffer module 1206 may also store information about the reference frame used and of the Motion Mode used. In the case of acceleration, for example, additional buffering may be useful for storing motion information of the $2^{nd}$ or even N previous frames when, for example, a more complicated model for acceleration is employed.

If a macroblock, subblock, or pixel is not associated with a Motion Vector (i.e., a macroblock is intra coded), then for such block it is assumed that the Motion Vector used is (0, 0) and that only the previous frame was used as reference.

If multi-frame referencing is used, one may select to use the motion information as is, and/or to interpolate the motion information with reference to the previous coded frame. This is essentially up to the design, but also in practice it appears that, especially for the case of (0, 0) motion vectors, it is less likely that the current block is still being referenced from a much older frame.

One may combine Direct Prediction with an additional set of Motion Information which is, unlike before, encoded as part of the Direct Prediction. In such a case the prediction can, for example, be a multi-hypothesis prediction of both the Direct Prediction and the Motion Information.

Since there are several possible Direct Prediction sub-modes that one may combine, such could also be combined within a multi-hypothesis framework. For example, the prediction from motion projection could be combined with that of pixel projection and/or spatial MV prediction.

Direct Prediction can also be used at the subblock level within a macroblock. This is already done for B frames inside the current H.26L codec, but is currently only using Motion Projection and not Pixel Projection or their combinations.

For B frame coding, one may perform Direct Prediction from only one direction (forward or backward) and not always necessarily from both sides. One may also use Direct Prediction inside the Bidirectional mode of B frames, where one of the predictions is using Direct Prediction.

In the case of Multi-hypothesis images, for example, it is possible that a P frame is referencing to a future frame. Here, proper scaling, and/or inversion of the motion information can be performed similar to B frame motion interpolation.

Run-length coding, for example, can also be used according to which, if subsequent "equivalent" Direct P modes are used in coding a frame or slice, then these can be encoded using a run-length representation.

DIRECT decision module 1208 essentially performs the decision whether the Direct Prediction mode should be used instead of the pre-existing Inter or Intra modes. By way of example, the decision may be based on joint Rate/Distortion Optimization criteria, and/or also separate bitrate or distortion requirements or restrictions.

It is also possible, in alternate implementations, that module Direct Prediction module 1208 precedes the ME module 1008. In such case, if Direct Prediction can provide immediately with a good enough estimate, based on some predefined conditions, for the motion parameters, ME module 1008 could be completely by-passed, thus also considerably reducing the computation of the encoding.

Figure 11:
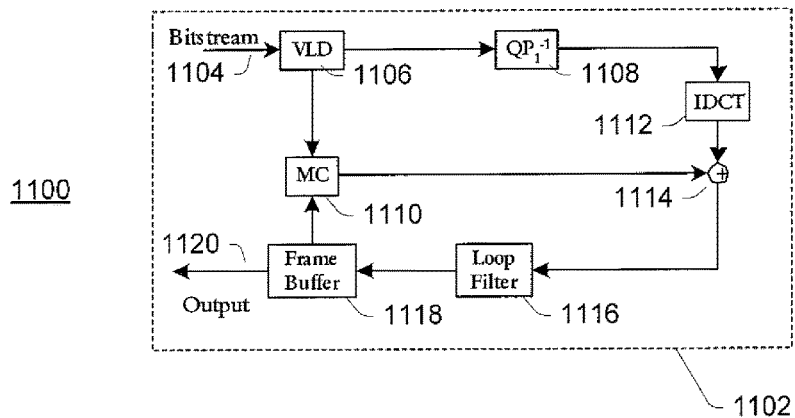
FIG. 11 is a block diagram depicting an exemplary improved video encoder using Direct Prediction, in accordance with certain exemplary implementations of the present invention.

Exemplary Decoding Processes:

Reference is now made to FIG. 11, which depicts an exemplary conventional decoding environment 1100 having a video decoder 1102 that receives an encoded video data bitstream 1104 and outputs corresponding (decoded) video data 1120.

Encoded video data bitstream 1104 is provided as an input to a variable length decoding (VLD) module 1106. The output of VLD module 1106 is provided as an input to a $QP^{-1}$ module 1108, and as an input to an MC module 1110. The output from $QP^{-1}$ module 1108 is provided as an input to an IDCT module 1112. The output of IDCT module 1112 is provided as an input to a summation module 1114, which also receives as an input an output from MC module 1110. The output from summation module 1114 is provided as an input to a loop filter module 1116. The output of loop filter module 1116 is provided to a frame buffer module 1118. An output from frame buffer module 1118 is provided as an input to MC module 1110. Frame buffer module 1118 also outputs (decoded) video data 1120.

Figure 13:
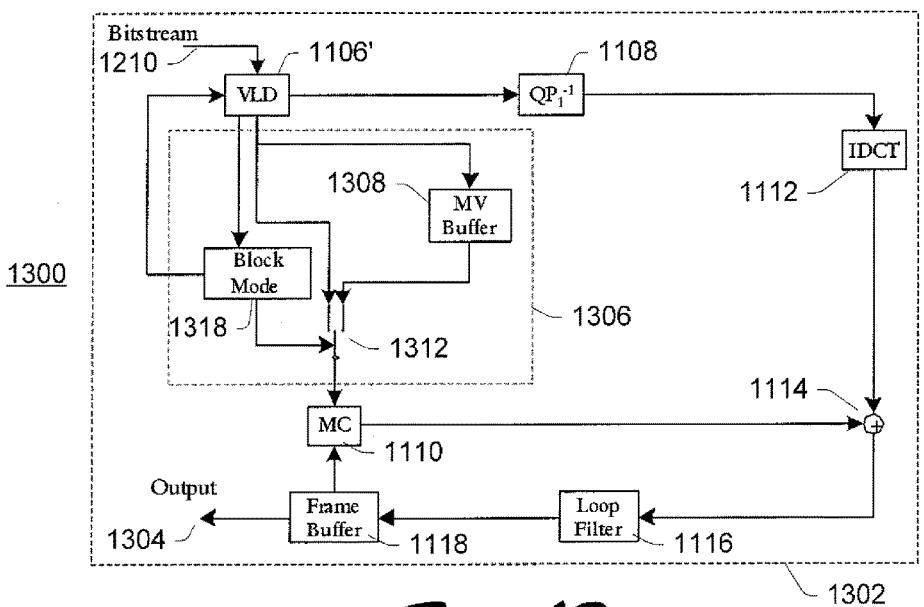
FIG. 13 is an illustrative diagram depicting a Direct Pixel/Block Projection technique, in accordance with certain exemplary implementations of the present invention.

An exemplary improved decoder 1302 for use in a Direct Prediction environment 1300 further includes an improvement 1306. Here, as shown in FIG. 13, improved decoder 1302 receives encoded video data bitstream 1210, for example, as output by improved video encoder 1202 of FIG. 12, and outputs corresponding video (decoded) video data 1304.

Improvement 1306, in this example, is operatively inserted between MC module 1110 and a VLD module 1106'. Improvement 1306 includes an MV buffer module 1308 that receives as an input, an output from VLD module 1106'. The output of MV buffer module 1308 is provided as a selectable input to a selection module 1312 of improvement 1306. A block mode module 1310 is also provided in improvement 1306. Block mode module 1310 receives as an input, an output from VLD module 1106'. An output of block mode module 1310 is provided as an input to VLD module 1106', and also as a controlling input to selection module 1312. An output from VLD module 1106' is provided as a selectable input to selection module 1312. Selection module 1312 is configured to selectably provide either an output from MV buffer module 1308 or VLD module 1106' as an input to MC module 1110.

With improvement 1306, for example, motion information for each pixel can be stored, and if the mode of a macroblock is identified as the Direct Prediction mode, then the stored motion information, and the proper Projection or prediction method is selected and used. It should be noted that if Motion Projection is used only, then the changes in an existing decoder are very minor, and the additional complexity that is added on the decoder could be considered negligible.

If submodes are used, then improved decoder 1302 can, for example, be configured to perform steps opposite to the prediction steps that improved encoder 1202 performs, in order to properly decode the current macroblock.

Again non referenced pixels (such as intra blocks) may be considered as having zero motion for the motion storage.

Some Exemplary Schemes

Considering that there are several possible predictors that may be immediately used with Direct Prediction, for brevity purposes in this description a smaller subset of cases, which are not only rather efficient but also simple to implement, are described in greater detail. In particular, the following models are examined in greater demonstrative detail:

(A) In this example, Motion Projection is the only mode used. No run-length coding of Direct Modes is used, where as residue information is also transmitted. A special modification of the motion parameters is performed in the case that a zero motion vector is used. In such a situation, the reference frame for the Direct Prediction is always set to zero (e.g., previous encoded frame). Furthermore, intra coded blocks are considered as having zero motion and reference frame parameters.

(B) This example is like example (A) except that no residue is transmitted.

(C) This example is basically a combination of examples (A) and (B), in that if QP<n (e.g., n=24) then the residue is also encoded, otherwise no residue is transmitted.

(D) This example is an enhanced Direct Prediction scheme that combines three submodes, namely:

(1) Motion Projection ($\overrightarrow{MV}_{MP}$);

(2) Spatial MV Prediction ($\overrightarrow{MV}_{SP}$); and (3) A weighted average of these two cases $$\left(\frac{[\overrightarrow{MV}_{MP} + 2*\overrightarrow{MV}_{SP}]}{3}\right).$$

Wherein, residue is not transmitted for QP<n (e.g., n=24). Here, run-length coding is not used. The partitioning of the submodes can be set as follows:

| Submodes | Code |
| --- | --- |
| Spatial Predictor | 0 |
| Motion Projection | 1 |
| Weighted Average | 2 |

The best submode could be selected using a Rate Distortion Optimization process (best compromise between bitrate and quality).

(E) A combination of example (C) with Pixel Projection. Here, for example, an average of two predictions for the Direct Prediction Mode.

(F) This is a combination of example (C) with Motion_Copy R2 (see. e.g., Jani Lainema and Marta Karczewicz, "Skip mode motion compensation", Doc. JVT-C027, May 2002, which is incorporated herein by reference) or the like. This case can be seen as an alternative of the usage of the Spatial MV Predictor used in example (D), with one difference being that the spatial predictor, under certain conditions, completely replaces the zero skip mode, and that this example (F) can be run-length encoded thus being able to achieve more efficient performance.

Motion Vector Prediction in Bidirectionally Predictive (B) Frames with Regards to Direct Mode:

The current JVT standard appears to be quite unclear on how a Direct Mode coded macroblock or block should be considered in the motion vector prediction within Bidirectionally Predicted (B) frames. Instead, it appears that the current software considers a Direct Mode Macroblock or subblock as having a "different reference frame" and thus not used in the prediction. Unfortunately, considering that there might still be high correlation between the motion vectors of a Direct predicted block with its neighbors such a condition could considerably hinder the performance of B frames and reduce their efficiency. This could also reduce the efficiency of error concealment algorithms when applied to B frames.

In this section, exemplary alternative approaches are presented, which can improve the coding efficiency increase the correlation of motion vectors within B frames, for example. This is done by considering a Direct Mode coded block essentially equivalent to a Bidirectionally predicted block within the motion prediction phase.

Direct Mode Macroblocks or blocks (for example, in the case of 8×8 sub-partitions) could considerably improve the efficacy of Bidirectionally Predicted (B) frames since they can effectively exploit temporal correlations of motion vector information of adjacent frames. The idea is essentially derived from temporal interpolation techniques where the assumption is made that if a block has moved from a position (x+dx, y+dy) at time t to a position (x, y) at time t+2, then, by using temporal interpolation, at time t+1 the same block must have essentially been at position:

$$\left(x+\frac{dx}{2}, y+\frac{dy}{2}\right)$$

Figure 14:
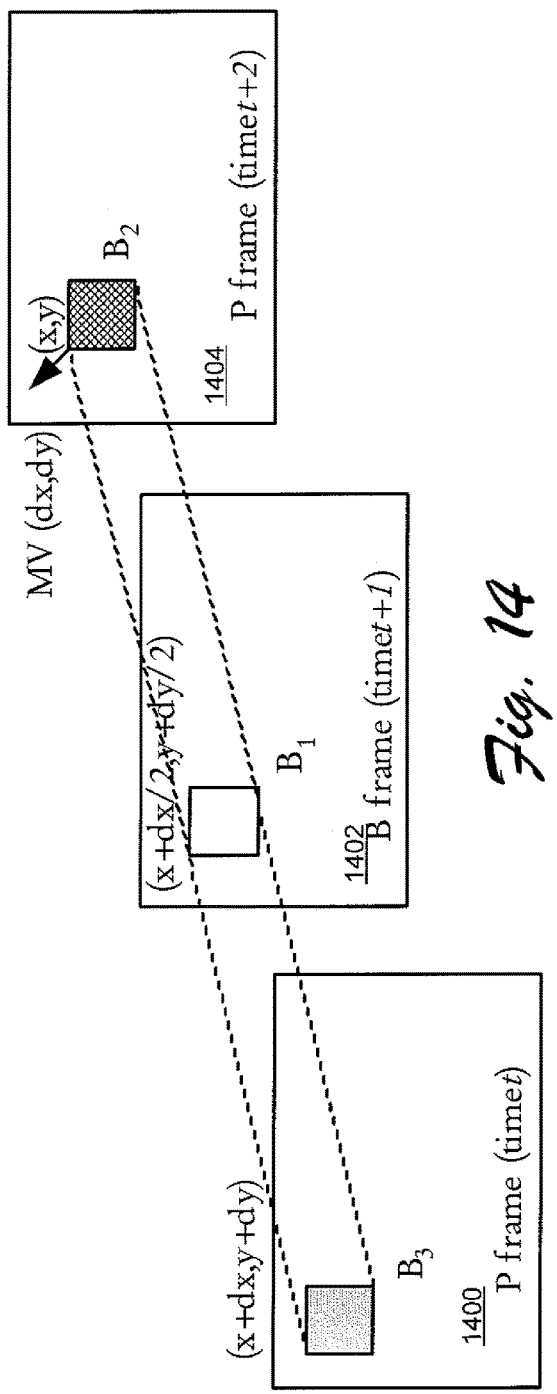
FIG. 14 is an illustrative diagram depicting a Direct Motion Projection technique suitable for use in B Frame coding, in accordance with certain exemplary implementations of the present invention.

This is illustrated, for example, in FIG. 14, which shows three frames, namely, a P frame 1400, a B frame 1402 and P frame 1404, corresponding to times t, t+1, and t+2, respectively. The approach though most often used in current encoding standards instead assumes that the block at position (x, y) of frame at time t+1 most likely can be found at positions:

$$\left(x+\frac{dx}{2}, y+\frac{dy}{2}\right) \text{ at time } t \text{ and}$$

$$\left(x-\frac{dx}{2}, y-\frac{dy}{2}\right) \text{ at time } t+2.$$

Figure 15:
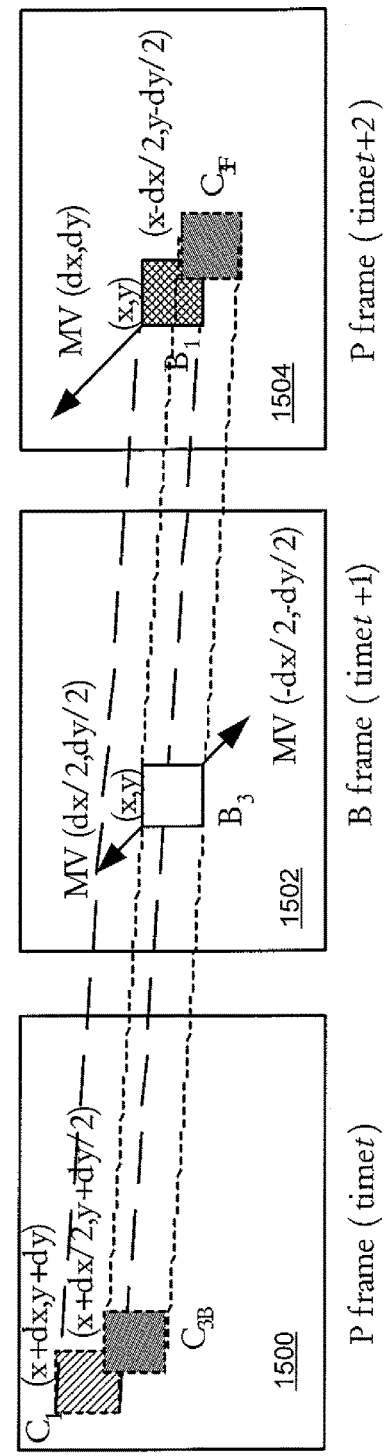
FIG. 15 is an illustrative diagram depicting motion vector predictions, in accordance with certain exemplary implementations of the present invention.

The later is illustrated in FIG. 15, which shows three frames, namely, a P frame 1500, a B frame 1502 and P frame 1504, corresponding to times t, t+1, and t+2, respectively. Since the number of Direct Mode coded blocks within a sequence can be significant, whereas no residue and motion information are transmitted for such a case, efficiency of B frames can be considerably increased. Run-length coding (for example, if the Universal Variable Length Code (UVLC) entropy coding is used) may also be used to improve performance even further.

Unfortunately, the current NT standard does not clarify how the motion vector prediction of blocks adjacent to Direct Mode blocks should be performed. As it appears from the current software, Direct Mode blocks are currently considered as having a "different reference frame" thus no spatial correlation is exploited in such a case. This could considerably reduce the efficiency of the prediction, but could also potentially affect the performance of error concealment algorithms applied on B frames in case such is needed.

By way of example, if one would like to predict the motion vector of E in the current codec, if A, B, C, and D were all Direct Mode coded, then the predictor will be set as (0,0) which would not be a good decision.

Figure 16:
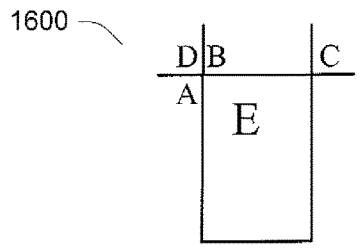
FIG. 16 is an illustrative diagram depicting interlace coding techniques for P frames, in accordance with certain exemplary implementations of the present invention.

In FIG. 16, for example, E is predicted from A, B, C, and D. Thus, if A, B, C, or D are Direct Mode coded then their actual values are not currently used in the prediction. This can be modified, however. Thus, for example, if A, B, C, or D are Direct Mode coded, then actual values of Motion Vectors and reference frames can be used in the prediction. This provides two selectable options: (1) if collocated macroblock/block in subsequent P frame is intra coded then a reference frame is set to −1; (2) if collocated macroblock/block in subsequent P frame is intra coded then assume reference frame is 0.

In accordance with certain aspects of the present invention, instead one may use the actual Motion information available from the Direct Mode coded blocks, for performing the motion vector prediction. This will enable a higher correlation of the motion vectors within a B frame sequence, and thus can lead to improved efficiency.

One possible issue is how to appropriately handle Direct Mode Macroblocks for which, the collocated block/macroblock in the subsequent frame was intra coded. Here, for example, two possible options include:

(1) Consider this macroblock/block as having a different reference frame, thus do not use it in the motion vector prediction; and
(2) Consider this macroblock as having (0, 0) motion vector and reference frame 0.

In accordance with certain other exemplary implementations of the present invention, a further modification can be made in the de-blocking filter process. For the Direct Mode case, a de-blocking filter process can be configured to compare stored motion vector information that is taken from Direct Mode coded blocks—otherwise these would usually be considered as zero. In another modification, however, instead one may configure the de-blocking filter process to compare the (exact) motion vectors regardless of the block type that is used. Thus, in certain implementations, if for Direct Coded blocks no residue is transmitted, a "stronger" de-blocking filter can provide further improved performance.

Furthermore, in certain other implementations, the Rate Distortion Decision for B frames can be redesigned since it is quite likely that for certain implementations of the motion vector prediction scheme, a different langrangian parameter λ used in Rate Distortion Optimization decisions, may lead to further coding efficiency. Such λ can be taken, for example, as:

$$\lambda = 0.85 \times 2^{\frac{Qp}{3}}$$

Inter Mode Decision Refinement:

The NT standard currently has an overwhelming performance advantage versus most other current Block Based coding standards. Part of this performance can be attributed in the possibility of using variable block sizes raging from 16×16 down to 4×4 (pixels), instead of having fixed block sizes. Doing so, for example, allows for a more effective exploitation of temporal correlation. Unfortunately, it has been found that, due to the Mode Decision techniques currently existing in conventional coding logic (e.g., hardware, firmware, and/or software), mode decisions might not be optimally performed, thus wasting bits that could be better allocated.

In this section, further methods and apparatuses are provided that at least partly solve this problem and/or others. Here, the exemplary methods and apparatuses have been configured for use with at least 16×8 and 8×16 (pixel) block modes. Furthermore, using a relatively simple solution where at least one additional criterion is introduced, a saving of between approximately 5% and 10% is provided in the complexity of the encoder.

Two key features of the JVT standard are variable macroblock mode selection and Rate Distortion Optimization. A 16×16 (pixel) macroblock can be coded using different partitioning modes for which motion information is also transmitted. The selection of the mode to be used can be performed in the Rate Distortion Optimization phase of the encoding where a joint decision of best possible quality at best possible bitrate is attempted. Unfortunately, since the assignments of the best possible motion information for each subpartition is done in an entirely different process of the encoding, it is possible in some cases, that a non 16×16 mode (e.g. 16×8 or 8×16 (pixel)) carries motion information that is equivalent to a 16×16 macroblock. Since the motion predictors used for each mode could also be different, it is quite possible in many cases that such 16×16 type motion information could be different from the one assigned to the 16×16 mode. Furthermore, under certain conditions, the Rate Distortion Optimization may in the end decide to use the non 16×16 macroblock type, even though it continues 16×16 motion information, without examining whether such could have been better if coded using a 16×16 mode.

Recognizing this, an exemplary system can be configured to determine when such a case occurs, such that improved performance may be achieved. In accordance with certain exemplary implementations of the present invention, two additional modes, e.g., referred to as P2to1 and P3to1, are made available within the Mode decision process/phase. The P2to1 and P3to1 modes are enabled when the motion information of a 16×8 and 8×16 subpartitioning, respectively, is equivalent to that of a 16×16 mode.

In certain implementations all motion vectors and reference frame assigned to each partition may be equal. As such, the equivalent mode can be enabled and examined during a rate distortion process/phase. Since the residue and distortion information will not likely change compared to the subpartition case, they can be reused without significantly increasing computation.

Considering though that the Rate Distortion Mode Decision is not perfect, it is possible that the addition and consideration of these two additional modes regardless of the current best mode may, in some limited cases, reduce the efficiency instead of improving it. As an alternative, one may enable these modes only when the corresponding subpartitioning mode was also the best possible one according to the Mode decision employed. Doing so may yield improvements (e.g., bitrate reduction) versus the other logic (e.g., codecs, etc.), while not affecting the PSNR.

If the motion information of the 16×8 or 8×16 subpartitioning is equivalent to that of the 16×16 mode, then performing mode decision for such a mode may be unnecessary. For example, if the motion vector predictor of the first subpartition is exactly the same as the motion vector predictor of the 16×16 mode performing mode decision is unnecessary. If such condition is satisfied, one may completely skip this mode during the Mode Decision process. Doing so can significantly reduce complexity since it would not be necessary, for this mode, to perform DCT, Quantization, and/or other like Rate Distortion processes/measurements, which tend to be rather costly during the encoding process.

In certain other exemplary implementations, the entire process can be further extended to a Tree-structured macroblock partition as well. See, e.g., Heiko Schwarz and Thomas Wiegand, "Tree-structured macroblock partition", Doc. VCEG-N17, December 2001.

An Exemplary Algorithm

Below are certain acts that can be performed to provide a mode refinement in an exemplary codec or other like logic (note that in certain other implementations, the order of the act may be changed and/or that certain acts may be performed together):

Act 1: Set Valid[P2to1]=Valid[P3to1]=0.

Act 2: Perform Motion Vector and Reference frame decision for each possible Inter Mode. Let $\overrightarrow{MV}_{16\times16}$, $\overrightarrow{MVP}_{16\times16}$, and $\text{refframe}_{16\times16}$ be the motion vector, motion vector predictor, and reference frame of the 16×16 mode, $\{\overrightarrow{MV}^a_{16\times8}, \overrightarrow{MV}^b_{16\times8}\}$, $\{\overrightarrow{MVP}^a_{16\times8}, \overrightarrow{MVP}^b_{16\times8}\}$, and $\{\text{refframe}^a_{16\times8}, \text{refframe}^b_{16\times8}\}$ the corresponding information for the 16×8 mode, and $\{\overrightarrow{MV}^a_{8\times16}, \overrightarrow{MV}^b_{8\times16}\}$, $\{\overrightarrow{MVP}^a_{8\times16}, \overrightarrow{MVP}^b_{8\times16}\}$, and $\{\text{refframe}^a_{8\times16}, \text{refframe}^b_{8\times16}\}$ for the 8×16 mode.

Act 3: If $(\overrightarrow{MV}^a_{16\times8}!=\overrightarrow{MV}^b_{16\times8})\text{OR}(\text{refframe}_{16\times8}{}^a!=\text{refframe}_{16\times8}{}^b)$ and goto Act 7.

Act 4: If $(\overrightarrow{MV}^a_{16\times8}!=\overrightarrow{MV}_{16\times16})\text{OR}(\overrightarrow{MVP}^a_{16\times8}!=\overrightarrow{MVP}_{16\times8})\text{OR}(\text{refframe}_{16\times8}{}^a!=\text{refframe}_{16\times8}{}^b)$, then goto Act 6.

Act 5: Valid[16×8]=0; goto Act 7
(e.g., Disable 16×8 mode if identical to 16×16. Complexity reduction).

Act 6: Valid[P2to1]=1; (e.g., Enable refinement mode for 16×8)
$\overrightarrow{MV}_{P2to1}=\overrightarrow{MV}^a_{16\times8}$; $\text{refframe}_{P2to1}=\text{refframe}_{16\times8}{}^a$;

Act 7: If $(\overrightarrow{MV}^a_{8\times16}!=\overrightarrow{MV}^b_{8\times16})\text{OR}(\text{refframe}_{8\times16}{}^a!=\text{refframe}_{8\times16}{}^b)$, then goto Act 11.

Act 8: If $(\overrightarrow{MV}^a_{8\times16}!=\overrightarrow{MV}_{16\times16})\text{OR}(\overrightarrow{MVP}^a_{8\times16}!=\overrightarrow{MVP}_{16\times16})\text{OR}(\text{refframe}_{8\times16}{}^a!=\text{refframe}_{16\times16})$
then goto Act 10.

Act 9: Valid[8×16]=0; goto Act 11
(e.g., Disable 8×16 mode if identical to 16×16 to reduce complexity)

Act 10: Valid[P3to1]=1
(e.g., enable refinement mode for 8×16)
$\overrightarrow{MV}_{P3to1}=\overrightarrow{MV}^a_{8\times16}$; $\text{refframe}_{P3to1}=\text{refframe}_{8\times16}{}^a$;

Act 11: Perform Rate Distortion Optimization for all Inter & Intra modes if
(Valid[MODE]=1)
where MODE∈{INTRA 4×4, INTRA 16×16, SKIP, 16×16, 16×8, 8×16, P8×8}, using the langrangian functional:
J(s, c, MODE|QP, $\lambda_{MODE}$)=SSD(s, c, MODE|QP)+ $\lambda_{MODE}\cdot$R(s, c, MODE|QP) ActSet best mode to Best-Mode Act 12: If
(BestMode!=16×8) then Valid[P3to1]=0 (note that this act is optional).

Act 13 If
(BestMode!=8×16) then Valid[P2to1]=0 (note that this act is optional).

Act 14: Perform Rate Distortion Optimization for the two additional modes if
(Valid[MODE]=1) where MODE∈{P2to1, P3to1}
(e.g., modes are considered equivalent to 16×16 modes).

Act 15: Set BestMode to the overall best mode found.

Applying Exemplary Direct Prediction Techniques for Interlace Coding:

Due to the increased interest of interlaced video coding inside the H.26L standard, several proposals have been presented on enhancing the encoding performance of interlaced sequences. In this section techniques are presented that can be implemented in the current syntax of H.26L, and/or other like systems. These exemplary techniques can provide performance enhancement. Furthermore, Direct P Prediction technology is introduced, similar to Direct B Prediction, which can be applied in both interlaced and progressive video coding.

Further Information on Exemplary Direct P Prediction Techniques:

Direct Mode of motion vectors inside B-frames can significantly benefit encoding performance since it can considerably reduce the bits required for motion vector encoding, especially considering that up to two motion vectors have to be transmitted. If, though, a block is coded using Direct Mode, no motion vectors are necessary where as instead these are calculated as temporal interpolations of the motion vectors of the collocated blocks in the first subsequent reference image. A similar approach for P frames appears to have never been considered since the structure of P frames and of their corresponding macroblock was much simpler, while each macroblock required only one motion vector. Adding such a mode would have instead, most likely, incurred a significant overhead, thus possibly negating any possible gain.

In H.26L on the other hand, P frames were significantly enhanced by introducing several additional macroblock Modes. As described previously, in many cases it might even be necessary to transmit up to 16 motion vectors per macroblock. Considering this additional Mode Overhead that P frames in H.26L may contain, an implementation of Direct Prediction of the motion vectors could be viable. In such a way, all bits for the motion vectors and for the reference frame used can be saved at only the cost of the additional mode, for example, see FIG. 4.

Even though a more straightforward method of Direct P prediction is to select the Motion vectors of the collocated pixels in the previous frame, in other implementations one may also consider Motion Acceleration as an alternative solution. This comes from the fact that maybe motion is changing frame by frame, it is not constant, and by using acceleration better results could be obtained, for example, see FIG. 7.

Such techniques can be further applied to progressive video coding. Still, considering the correlation that fields may have in some cases inside interlace sequences, such as for example regions with constant horizontal only movement, this approach can also help improve coding efficiency for interlace sequence coding. This is in particular beneficial for known field type frames, for example, if it is assumed that the motion of adjacent fields is the same. In this type of arrangement, same parity fields can be considered as new frames and are sequentially coded without taking consideration of the interlace feature. Such is entirely left on the decoder. By using this exemplary Direct P mode though, one can use one set of motion vectors for the first to be coded field macroblock (e.g., of size 16×16 pixels) where as the second field at the same location is reusing the same motion information. The only other information necessary to be sent is the coded residue image. In other implementations, it is possible to further improve upon these techniques by considering correlations between the residue images of the two collocated field Blocks.

In order to allow Direct Mode in P frames, it is basically necessary to add one additional Inter Mode into the system. Thus, instead of having only 8 Inter Modes, in one example, one can now use 9 which are shown below:

| INTER MODES | | Description |
| --- | --- | --- |
| COPY_MB | 0 | Skip macroblock Mode |
| M16x16_MB | 1 | One 16 × 16 block |
| M16x8_MB | 2 | Two 16 × 8 blocks |
| M8x16_MB | 3 | Two 8 × 16 blocks |
| M8x8_MB | 4 | Four 8 × 8 blocks |
| M8x4_MB | 5 | Eight 8 × 4 blocks |
| M4x8_MB | 6 | Eight 4 × 8 blocks |
| M4x4_MB | 7 | Sixteen 16 × 8 blocks |
| PDIRECT_MB | 8 | Copy Mode and motion vectors of collocated macroblock in previous frame |

In general, such exemplary Direct Modes for P frames can appear if the collocated macroblock was also of INTER type, except Skip macroblock, but including Direct Mode, since in other cases there is no motion information that could be used. In the case of the previous macroblock also being coded in Direct P Mode, the most recent Motion Vectors and Mode for this macroblock are considered instead. To more efficiently though handle the cases that this Mode will not logically appear, and in particular if INTRA mode was used, one may select of allowing this Mode to also appear in such cases with the Mode now signifying a second Skip Macroblock Mode where a copy the information is not from the previous frame, but from the one before it. In this case, no residue information is encoded. This is particularly useful for Interlace sequences, since it is more likely that a macroblock can be found with higher accuracy from the same parity field frame, and not from the previously coded field frame as was presented in previous techniques.

For further improved efficiency, if a set of two Field type frames is used when coding interlace images, the Skip Macroblock Mode can be configured to use the same parity field images. If Direct P mode is used as a skipping flag, for example, then the different parity is used instead. An additional benefit of Direct P mode, is that it may allow for a significant complexity reduction in the encoder since it is possible to allow the system to perform a pre-check to whether the Direct. P mode gives a satisfactory enough solution, and if so, no additional computation may be necessary for the mode decision and motion estimation of that particular block. To also address the issue of motion vector coding, the motion vectors used for Direct P coding can be used "as is" for the calculation of a MEDIAN predictor.

Best Field First Technique & Field Reshuffling:

Coding of interlaced sequence allowing support of both interlace frame material, and separate interlace field images inside the same stream would likely provide a much better solution than coding using only one of the two methods. The separate interlace field technique has some additional benefits, such as, for example, de-blocking, and in particular can provide enhanced error resilience. If an error happens inside one field image, for example, the error can be easily consumed using the information from the second image.

This is not the case for the frame based technique, where especially when considering the often large size of and bits used by such frames, errors inside such a frame can happen with much higher probability. Reduced correlation between pixels/blocks may not promote error recovery.

Figure 17:
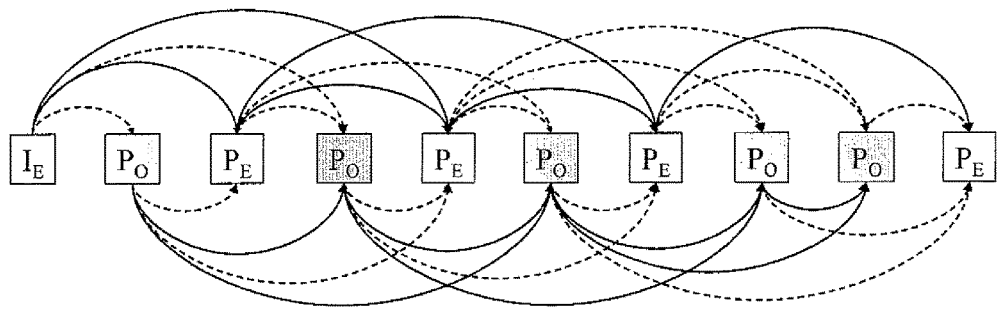
FIG. 17 is an illustrative diagram depicting interlace coding techniques for B frames, in accordance with certain exemplary implementations of the present invention.
Figure 18:
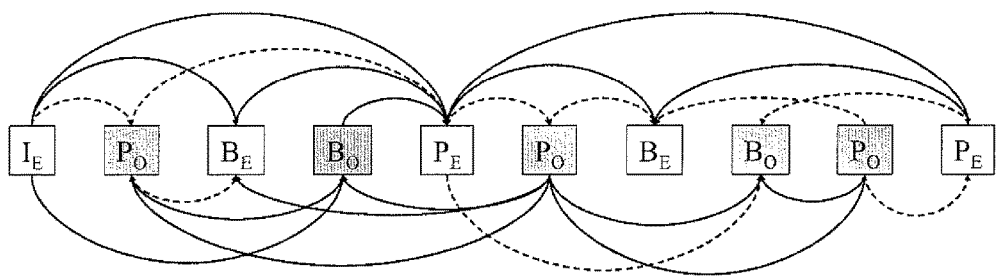
FIG. 18 is an illustrative diagram depicting interlace coding techniques using frame and field based coding, in accordance with certain exemplary implementations of the present invention.

Here, one can further improve on the field/frame coding concept by allowing the encoder to select which field should be encoded first, while disregarding which field is to be displayed first. This could be handled automatically on a decoder where a larger buffer will be needed for storing a future field frame before displaying it. For example, even though the top field precedes the bottom field in terms of time, the coding efficiency might be higher if the bottom field is coded and transmitted first, followed by the top field frame. The decision may be made, for example, in the Rate Distortion Optimization process/phase, where one first examines what will the performance be if the Odd field is coded first followed by the Even field, and of the performance if the Even field is instead coded and is used as a reference for the Odd field. Such a method implies that both the encoder and the decoder should know which field should be displayed first, and any reshuffling done seamlessly. It is also important that even though the Odd field was coded first, both encoder and decoder are aware of this change when indexing the frame for the purpose of INTER/INTRA prediction. Illustrative examples of such a prediction scheme, using 4 reference frames, are depicted in FIG. 17 and FIG. 18. In FIG. 17, interlace coding is shown using an exemplary Best Field First scheme in P frames. In FIG. 18, interlace coding is shown using a Best Field First scheme in B frames.

Figure 19:
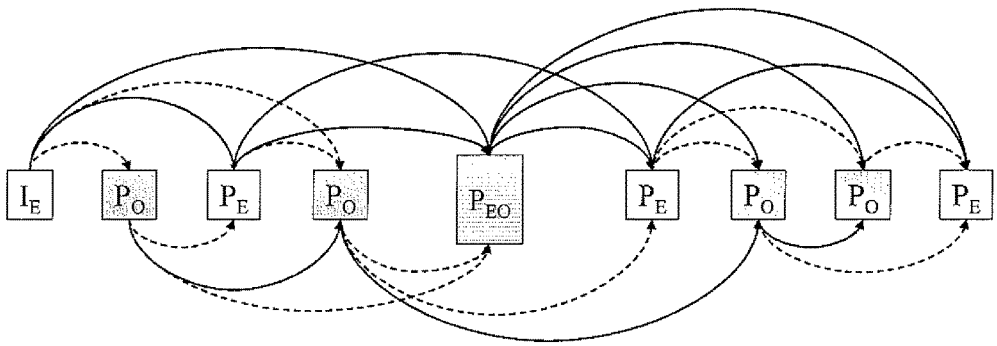
FIG. 19 is an illustrative diagram depicting a scheme for coding joint field/frame images, in accordance with certain exemplary implementations of the present invention.

In the case of coding joint field/frame images, the scheme illustratively depicted in FIG. 19 may be employed. Here, an exemplary implementation of a Best Field First scheme with frame and field based coding is shown. If two frames are used for the frame based motion estimation, then at least five field frames can be used for motion estimation of the fields, especially if field swapping occurs. This allows referencing of at least two field frames of the same parity. In general 2×N+1 field frames should be stored if N full frames are to be used. Frames also could easily be interleaved and deinterleaved on the encoder and decoder for such processes.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. One or more computer-readable memory or storage devices having stored thereon computer-executable instructions for causing one or more processing units, when programmed thereby, to perform operations, the operations comprising:

encoding a current frame in a sequence of video frames, wherein the current frame includes multiple blocks that are different portions of the current frame, and wherein the encoding the current frame includes, for each given block among the multiple blocks of the current frame, encoding the given block using motion compensation without using motion vector ("MV") information in a bit stream for the given block but according to identifying information in the bit stream for the given block, wherein the identifying information in the bit stream for the given block indicates how to derive the MV information for the given block, and wherein:

if the identifying information in the bit stream for the given block indicates motion projection is used for the given block, the MV information for the given block is derived using MV information of a block of another frame in the sequence of video frames; and if the identifying information in the bit stream for the given block indicates spatial prediction is used for the given block, the MV information for the given block is derived using MV information for one or more surrounding blocks of the current frame; and outputting encoded data for the current frame in the bit stream, wherein, for each given block among the multiple blocks of the current frame, the encoded data in the bit stream includes the identifying information in the bit stream for the given block that indicates how to derive the MV information for the given block, and the identifying information in the bit stream for the given block is separate from the identifying information in the bitstream for other blocks among the multiple blocks of the current frame.

2. The one or more computer-readable memory or storage devices of claim 1, wherein the current frame is a P-frame.

3. The one or more computer-readable memory or storage devices of claim 1, wherein the current frame is a B-frame.

4. The one or more computer-readable memory or storage devices of claim 1, wherein, for each given block among the multiple blocks of the current frame, the encoded data in the bit stream further includes mode information for the given block that indicates whether the given block is motion compensated with or without using MV information in the bit stream for the given block, wherein the mode information indicates the given block is motion compensated without using MV information in the bit stream for the given block, and wherein the encoded data in the bit stream includes the identifying information in the bit stream for the given block since the mode information indicates the given block is motion compensated without using MV information in the bit stream for the given block.

5. The one or more computer-readable memory or storage devices of claim 1, wherein the given block is encoded using motion compensation with MV information derived by motion projection, and wherein the motion projection uses temporal prediction of the MV information for the given block using the MV information of the block of the other frame.

6. The one or more computer-readable memory or storage devices of claim 1, wherein the encoding the given block further comprises:

determining a residual for the given block; and
encoding the residual for the given block.

7. The one or more computer-readable memory or storage devices of claim 1, wherein the encoding the given block further comprises:

evaluating how to derive the MV information for the given block as part of rate-distortion optimization for the given block; and selecting between using motion projection and spatial prediction for the given block.

8. The one or more computer-readable memory or storage devices of claim 1, wherein the current frame has multiple available reference frames, and wherein, for each given block among the multiple blocks of the current frame, the encoded data further includes an indication of reference frame used for the given block.

9. One or more computer-readable memory or storage devices having stored thereon computer-executable instructions for causing one or more processing units, when programmed thereby, to perform operations, the operations comprising:

receiving encoded data in a bit stream for a current frame in a sequence of video frames, wherein the current frame includes multiple blocks that are different portions of the current frame, the encoded data in the bit stream including, for each given block among the multiple blocks of the current frame, identifying information in the bit stream for the given block that indicates how to derive motion vector ("MV") information for the given block, wherein the identifying information in the bit stream for the given block is separate from the identifying information in the bitstream for other blocks among the multiple blocks of the current frame; and decoding the current frame, including, for each given block among the multiple blocks of the current frame, decoding the given block using motion compensation without using MV information in the bit stream for the given block but according to the identifying information in the bit stream for the given block, wherein:

if the identifying information in the bit stream for the given block indicates motion projection is used for the given block, the MV information for the given block is derived using MV information of a block of another frame in the sequence of video frames; and if the identifying information in the bit stream for the given block indicates spatial prediction is used for the given block, the MV information for the given block is derived using MV information for one or more surrounding blocks of the current frame.

10. The one or more computer-readable memory or storage devices of claim 9, wherein the current frame is a P-frame.

11. The one or more computer-readable memory or storage devices of claim 9, wherein the current frame is a B-frame.

12. The one or more computer-readable memory or storage devices of claim 9, wherein, for each given block among the multiple blocks of the current frame, the encoded data in the bit stream further includes mode information for the given block that indicates whether the given block is motion compensated with or without using MV information in the bit stream for the given block, wherein the mode information indicates the given block is motion compensated without using MV information in the bit stream for the given block, and wherein the encoded data in the bit stream includes the identifying information in the bit stream for the given block since the mode information indicates the given block is motion compensated without using MV information in the bit stream for the given block.

13. The one or more computer-readable memory or storage devices of claim 9, wherein the given block is decoded using motion compensation with MV information derived by motion projection, and wherein the motion projection uses temporal prediction of the MV information for the given block using the MV information of the block of the other frame.

14. The one or more computer-readable memory or storage devices of claim 9, wherein the decoding the given block further comprises:

decoding a residual for the given block; and
combining the residual with a motion-compensated prediction for the given block.

15. The one or more computer-readable memory or storage devices of claim 9, wherein the current frame has multiple available reference frames, and wherein, for each given block among the multiple blocks of the current frame, the encoded data further includes an indication of reference frame used for the given block.

16. One or more computer-readable memory or storage devices having stored thereon encoded data in a bit stream for a current frame in a sequence of video frames, wherein the current frame includes multiple blocks that are different portions of the current frame, the encoded data in the bit stream including, for each given block among the multiple blocks of the current frame, identifying information in the bit stream for the given block that indicates how to derive motion vector ("MV") information for the given block, wherein the identifying information in the bit stream for the given block is separate from the identifying information in the bitstream for other blocks among the multiple blocks of the current frame, and wherein the encoded data is configured to facilitate decoding of the current frame that include, for each given block among the multiple blocks of the current frame, decoding the given block using motion compensation without using MV information in the bit stream for the given block but according to the identifying information in the bit stream for the given block, wherein:

if the identifying information in the bit stream for the given block indicates motion projection is used for the given block, the MV information for the given block is derived using MV information of a block of another frame in the sequence of video frames; and if the identifying information in the bit stream for the given block indicates spatial prediction is used for the given block, the MV information for the given block is derived using MV information for one or more surrounding blocks of the current frame.

17. The one or more computer-readable memory or storage devices of claim 16, wherein the current frame is a P-frame.

18. The one or more computer-readable memory or storage devices of claim 16, wherein the current frame is a B-frame.

19. The one or more computer-readable memory or storage devices of claim 16, wherein, for each given block among the multiple blocks of the current frame, the encoded data in the bit stream further includes mode information for the given block that indicates whether the given block is motion compensated with or without using MV information in the bit stream for the given block, wherein the mode information indicates the given block is motion compensated without using MV information in the bit stream for the given block, and wherein the encoded data in the bit stream includes the identifying information in the bit stream for the given block since the mode information indicates the given block is motion compensated without using MV information in the bit stream for the given block.

20. The one or more computer-readable memory or storage devices of claim 16, wherein the current frame has multiple available reference frames, and wherein, for each given block among the multiple blocks of the current frame, the encoded data further includes an indication of reference frame used for the given block.

* * * * *